US011720103B2

(12) United States Patent
Wu et al.

(10) Patent No.: US 11,720,103 B2
(45) Date of Patent: Aug. 8, 2023

(54) SYSTEM, METHOD AND ASSOCIATED APPARATUS FOR AUTONOMOUS VEHICLE TRANSPORTATION

(71) Applicant: BEIJING TUSEN ZHITU TECHNOLOGY CO., LTD., Beijing (CN)

(72) Inventors: Nan Wu, Beijing (CN); He Zheng, Beijing (CN)

(73) Assignee: BEIJING TUSEN ZHITU TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/045,420

(22) Filed: Oct. 10, 2022

(65) Prior Publication Data
US 2023/0068071 A1 Mar. 2, 2023

Related U.S. Application Data

(63) Continuation of application No. 16/748,730, filed on Jan. 21, 2020, now Pat. No. 11,467,577, which is a
(Continued)

(30) Foreign Application Priority Data

Jul. 21, 2017 (CN) .......................... 201710600173.0

(51) Int. Cl.
G05D 1/02 (2020.01)
G05D 1/00 (2006.01)
G06Q 10/0835 (2023.01)

(52) U.S. Cl.
CPC ......... G05D 1/0088 (2013.01); G05D 1/0225 (2013.01); G05D 1/0234 (2013.01);
(Continued)

(58) Field of Classification Search
CPC .. G05D 1/0088; G05D 1/0225; G05D 1/0234; G05D 2201/0216; G06Q 10/08355
See application file for complete search history.

(56) References Cited

U.S. PATENT DOCUMENTS 9,939,284 B2 * 4/2018 Meuleau .............. G05D 1/0088
11,009,359 B2 * 5/2021 Petersen .............. G05D 1/0202
(Continued)

FOREIGN PATENT DOCUMENTS

CA 2663927 A1 3/2008
CN 2795178 Y 7/2006
(Continued)

OTHER PUBLICATIONS

International Application No. PCT/CN2017/102034, International Search Report and Written Opinion dated Apr. 27, 2018.
(Continued)

Primary Examiner — Ramsey Refai
(74) Attorney, Agent, or Firm — Paul Liu; Julie J. Muyco; Perkins Coie, LLP

(57) ABSTRACT

The present disclosure provides a system, method and associated apparatus for autonomous vehicle transportation. The system includes: an operation system configured to generate a transportation plan for a vehicle and transmit the transportation plan to a vehicle controller of the vehicle; and the vehicle controller configured to control, in accordance with the transportation plan, the vehicle to autonomously move to a position of a checkpoint at an entrance to a target highway port, and interact with a checkpoint controller corresponding to the position of the checkpoint for autonomously passing the checkpoint; and control the vehicle to autonomously move from the position of the checkpoint to a specified loading/unloading position in the target highway port, and interact with a loading/unloading control apparatus for autonomous loading/unloading at the loading/unloading
(Continued)

position. The system, method and associated apparatus can achieve fully autonomous goods transportation, save transportation costs and reduce driving security risks.

20 Claims, 22 Drawing Sheets

Related U.S. Application Data continuation of application No. PCT/CN2017/102034, filed on Sep. 18, 2017.

(52) U.S. Cl.
CPC ............... *G06Q 10/08355* (2013.01); *G05D 2201/0216* (2013.01)

(56) References Cited

U.S. PATENT DOCUMENTS

| | | | |
|---|---|---|---|
| 2002/0055818 A1 | 5/2002 | Gaspard, II | |
| 2015/0345967 A1 | 12/2015 | Meuleau | |
| 2016/0341565 A1 | 11/2016 | Meuleau | |
| 2017/0059336 A1 | 3/2017 | Huang | |
| 2019/0168392 A1* | 6/2019 | Väin | B25J 11/00 |
| 2019/0196505 A1* | 6/2019 | High | G06Q 50/30 |

FOREIGN PATENT DOCUMENTS

| | | |
|---|---|---|
| CN | 101017577 A | 8/2007 |
| CN | 102077057 A | 5/2011 |
| CN | 103771106 A | 5/2014 |
| CN | 103988239 A | 8/2014 |
| CN | 104058261 A | 9/2014 |
| CN | 105005302 A | 10/2015 |
| CN | 105235714 A | 1/2016 |
| CN | 105700524 A | 6/2016 |
| CN | 105701865 A | 6/2016 |
| CN | 105867387 A | 8/2016 |
| CN | 105894669 A | 8/2016 |
| CN | 205526347 A | 8/2016 |
| CN | 106094830 A | 11/2016 |
| CN | 205721998 A | 11/2016 |
| CN | 106200636 A | 12/2016 |
| CN | 106203915 A | 12/2016 |
| CN | 205910730 U | 1/2017 |
| CN | 106373428 A | 2/2017 |
| CN | 106485340 A | 3/2017 |
| CN | 106525063 A | 3/2017 |
| CN | 106608480 A | 5/2017 |
| CN | 106781688 A | 5/2017 |
| CN | 106814733 A | 6/2017 |
| CN | 106845659 A | 6/2017 |
| CN | 206231228 A | 6/2017 |
| CN | 106914425 A | 7/2017 |
| CN | 106919090 A | 7/2017 |
| WO | 2017091066 | 6/2017 |

OTHER PUBLICATIONS

Chinese Application No. 201710600173.0 Office Action dated Jul. 3, 2018.
M. Burchielli, European Application No. 17918419.7-1202, Extended European Search Report dated Jul. 23, 2021, pp. 1-8.
Chinese Patent Office, Office Action for CN 201910116827.1, dated Dec. 25, 2019, 15 pages.
Chen, Xiujuan, "Automatic driving dream of truck", China Academic Journal Electronic Publishing House, Jul. 15, 2017, 78 Features.
European Patent Office, Extended European Search Report for EP Appl. No. 23157870.9, dated Apr. 19, 2023, 10 pages.

* cited by examiner

SYSTEM, METHOD AND ASSOCIATED APPARATUS FOR AUTONOMOUS VEHICLE TRANSPORTATION

This application is a continuation of U.S. patent application Ser. No. 16/748,730, entitled "SYSTEM, METHOD AND ASSOCIATED APPARATUS FOR AUTONOMOUS VEHICLE TRANSPORTATION," filed Jan. 21, 2022, which is a continuation of and claims priority to International Patent Application No. PCT/CN2017/102034, filed on Sep. 18, 2017, which claims the benefit of priority to Chinese Patent Application No. 201710600173.0, titled "SYSTEM, METHOD AND ASSOCIATED APPARATUS FOR AUTONOMOUS VEHICLE TRANSPORTATION", filed on Jul. 21, 2017, the content of which is incorporated herein by reference in its entirety.

TECHNICAL FIELD

The present disclosure relates to autonomous driving technology, and more particularly, to a system for autonomous vehicle transportation, a method for autonomous vehicle transportation, a vehicle controller and an operation system.

BACKGROUND

Currently, in order to improve the efficiency of goods transportation, highway ports are provided along highways, and coastal ports are provided along coasts, such that the goods can be dispatched and stored at the highway ports/coastal ports. At present, the main scheme for goods transportation is that truck drivers drive trucks for transportation between highway ports, between highway ports and other locations (such as warehouses, goods distribution centers, logistics transportation companies, factories, and the like), between coastal ports, or between coastal ports and other locations. However, this scheme for goods transportation requires not only a large number of truck drivers, but also a large number of management personnel, loading/unloading workers at the highway ports/coastal ports, resulting in high costs as well as security risks due to fatigue of truck drivers as they are very likely to drive long distances for a long time.

SUMMARY

In view of the above problem, the present disclosure provides a system, method and associated apparatus for autonomous vehicle transportation, capable of achieving fully autonomous goods transportation, saving transportation costs and reducing driving security risks.

According to an embodiment of the present disclosure, a system for autonomous vehicle transportation is provided. The system includes an operation system and a vehicle controller of a vehicle. The operation system is configured to generate a transportation plan for the vehicle and transmit the transportation plan to the vehicle controller of the vehicle. The vehicle controller is configured to control, in accordance with the transportation plan, the vehicle to autonomously move to a position of a checkpoint at an entrance to a target highway port, and interact with a checkpoint controller corresponding to the position of the checkpoint for autonomously passing the checkpoint; and control the vehicle to autonomously move from the position of the checkpoint to a specified loading/unloading position in the target highway port, and interact with a loading/unloading control apparatus for autonomous loading/unloading at the loading/unloading position.

According to an embodiment of the present disclosure, a vehicle controller is provided. The vehicle controller includes: a communication unit configured to transmit and receive information; and a control unit configured to control, in accordance with a transportation plan received by the communication unit, a vehicle to autonomously move to a position of a checkpoint at an entrance to a target highway port, and interact with a checkpoint controller corresponding to the position of the checkpoint for autonomously passing the checkpoint; and control the vehicle to autonomously move from the position of the checkpoint to a specified loading/unloading position in the target highway port, and interact with a loading/unloading control apparatus for autonomous loading/unloading at the loading/unloading position.

According to an embodiment of the present disclosure, an operation system is provided. The operation system includes: a vehicle scheduling unit configured to generate a transportation plan for a vehicle, transmit the transportation plan to a vehicle controller of the vehicle, and adjust the transportation plan for the vehicle based on a transportation plan execution progress for the vehicle; and a control unit configured to obtain the transportation plan execution progress for the vehicle executing the transportation plan and transmit the transportation plan execution progress to the vehicle scheduling unit.

According to an embodiment of the present disclosure, a method for autonomous vehicle transportation is provided. The method includes: generating, by an operation system, a transportation plan for a vehicle and transmitting the transportation plan to a vehicle controller of the vehicle; and controlling, by the vehicle controller in accordance with the transportation plan, the vehicle to autonomously move to a position of a checkpoint at an entrance to a target highway port, and interacting with a checkpoint controller corresponding to the position of the checkpoint for autonomously passing the checkpoint; and controlling the vehicle to autonomously move from the position of the checkpoint to a specified loading/unloading position in the target highway port, and interact with a loading/unloading control apparatus for autonomous loading/unloading at the loading/unloading position.

With the system and method for autonomous vehicle transportation, in one aspect, the operation system can manage and schedule vehicles, generate transportation plans for the respective vehicles, and synchronize the transportation plans to vehicle controllers of the respective vehicles, such that no management personnel are needed for managing and scheduling the vehicles. In another aspect, the vehicle controller controls the vehicle to execute the transportation plan so as to achieve autonomous transportation of goods, without the need for truck drivers. In yet another aspect, with the vehicle controller controlling movement of the vehicle, problems such as driving while tired, drunk or drugged can be avoided, thereby improving the driving security. Therefore, the solutions according to the present disclosure can not only save costs of goods transportation, but also reduce security risks in driving vehicles.

The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from these figures without applying any inventive skills. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

The core idea of the present disclosure has been described above. The solutions according to the embodiments of the present disclosure will be described in further detail below with reference to the figures, such that they can be better understood by those skilled in the art and that the above objects, features and advantages of the embodiments of the present disclosure will become more apparent.

In an embodiment of the present disclosure, a vehicle controller may be a Digital Signal Processing (DSP), Field-Programmable Gate Array (FPGA) controller, an industrial computer, a vehicle computer, an Electronic Control Unit (ECU), Vehicle Control Unit (VCU), or the like. The present disclosure is not limited to any of these examples.

The method and system for autonomous vehicle transportation according to the present disclosure are applicable to goods transportation in all closed areas, such as highway ports, coastal ports, goods distribution centers, warehouses, factories, logistics campuses, and the like. In order to facilitate the understanding by those skilled in the art, the embodiments of the present disclosure will be described with reference to examples in which a closed area is a highway port. The principles for autonomous transportation also apply to other closed areas and details thereof will be omitted here.

Embodiment 1

Figure 1:
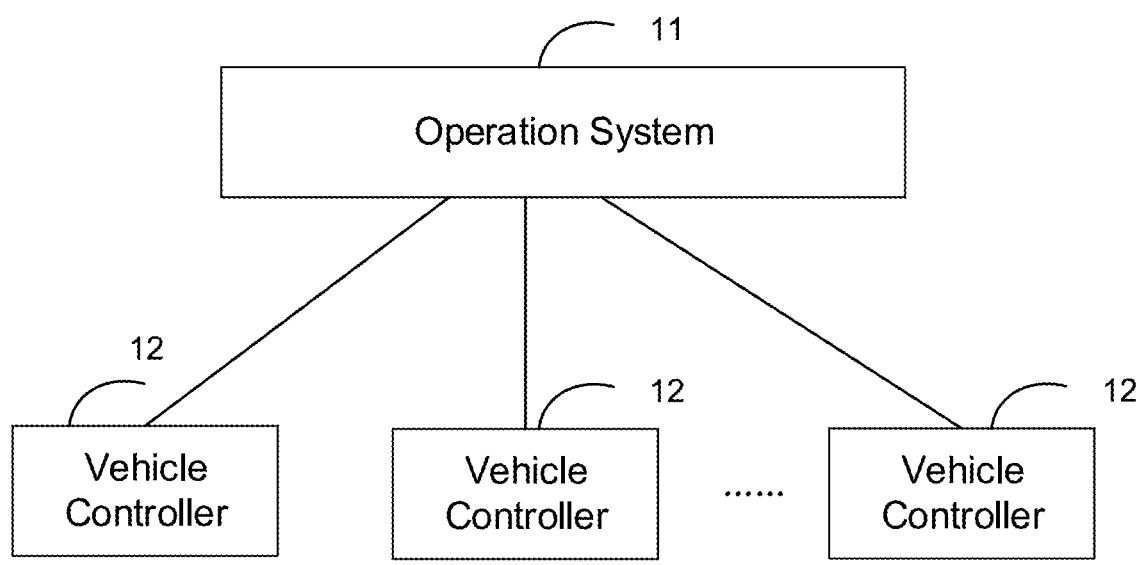
FIG. 1 is a first schematic diagram showing a structure of a system for autonomous vehicle transportation according to an embodiment of the present disclosure.

Referring to FIG. 1, which shows a system for autonomous vehicle transportation according to an embodiment of the present disclosure, the system includes an operation system 11 and a vehicle controller 12 of each of a plurality of vehicles.

The operation system 11 is configured to generate a transportation plan for the vehicle and transmit the transportation plan to the vehicle controller 12 of the vehicle.

The vehicle controller 12 is configured to control, in accordance with the transportation plan, the vehicle to autonomously move to a position of a checkpoint at an entrance to a target highway port, and interact with a checkpoint controller 13 corresponding to the position of the checkpoint for autonomously passing the checkpoint; and control the vehicle to autonomously move from the position of the checkpoint to a specified loading/unloading position in the target highway port, and interact with a loading/unloading control apparatus 14 for autonomous loading/unloading at the loading/unloading position.

In Embodiment 1 of the present disclosure, one operation system 11 can schedule and manage a plurality of vehicles for goods transportation between highway ports, or between highway ports and other locations (such as warehouses, docks, coastal ports, goods distribution centers, logistics campuses, railway stations, airports, and the like), and the present disclosure is not limited thereto.

Figure 2:
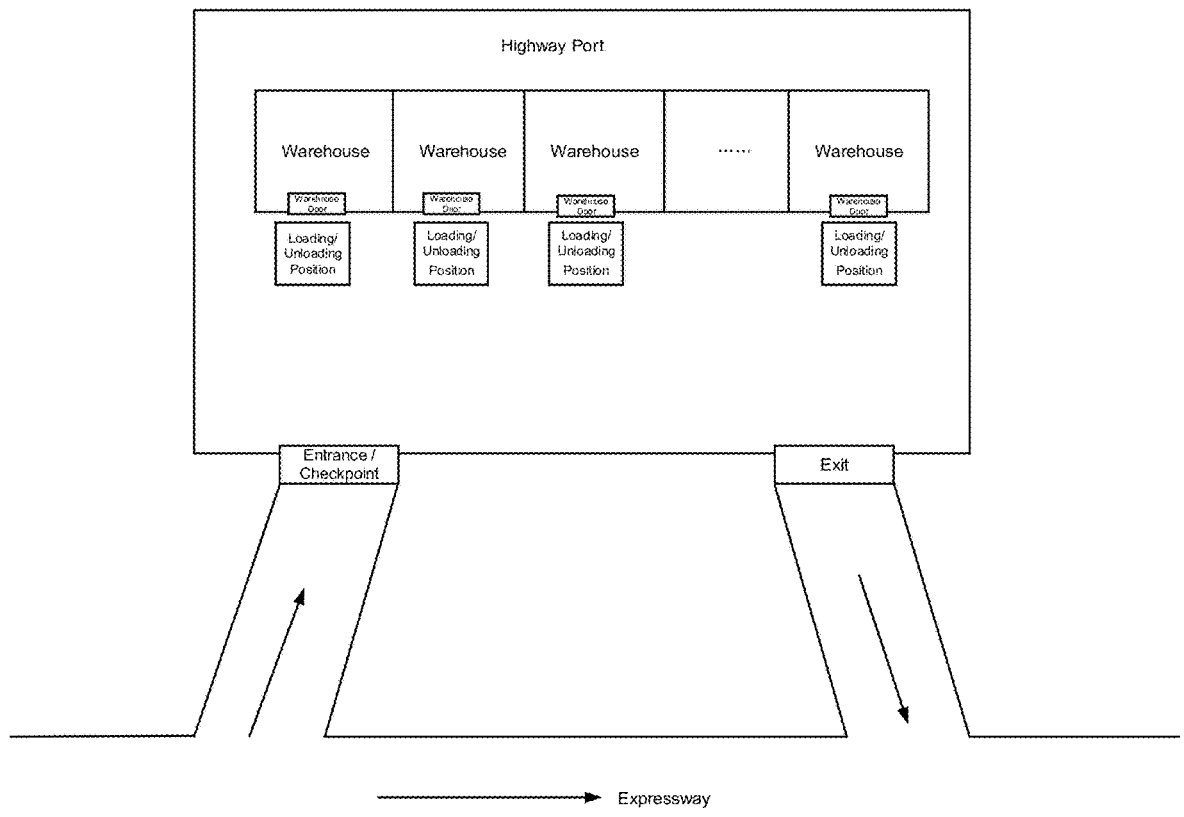
FIG. 2 is a first schematic diagram showing a structure of a highway port according to an embodiment of the present disclosure.

In an example, as shown in FIG. 2, the highway port has an entrance, an exit and a plurality of warehouses (the warehouses are numbered accordingly). A checkpoint is provided at the entrance, and a vehicle enters the highway port after autonomously passing the checkpoint at a checkpoint position. Each warehouse has a warehouse door, in front of which a corresponding loading/unloading position is provided. The vehicle, after passing the checkpoint, moves to and stops at a loading/unloading position corresponding to a target warehouse, so as to load predetermined goods from the target warehouse, or unload goods carried on the vehicle to the target warehouse.

Figure 3:
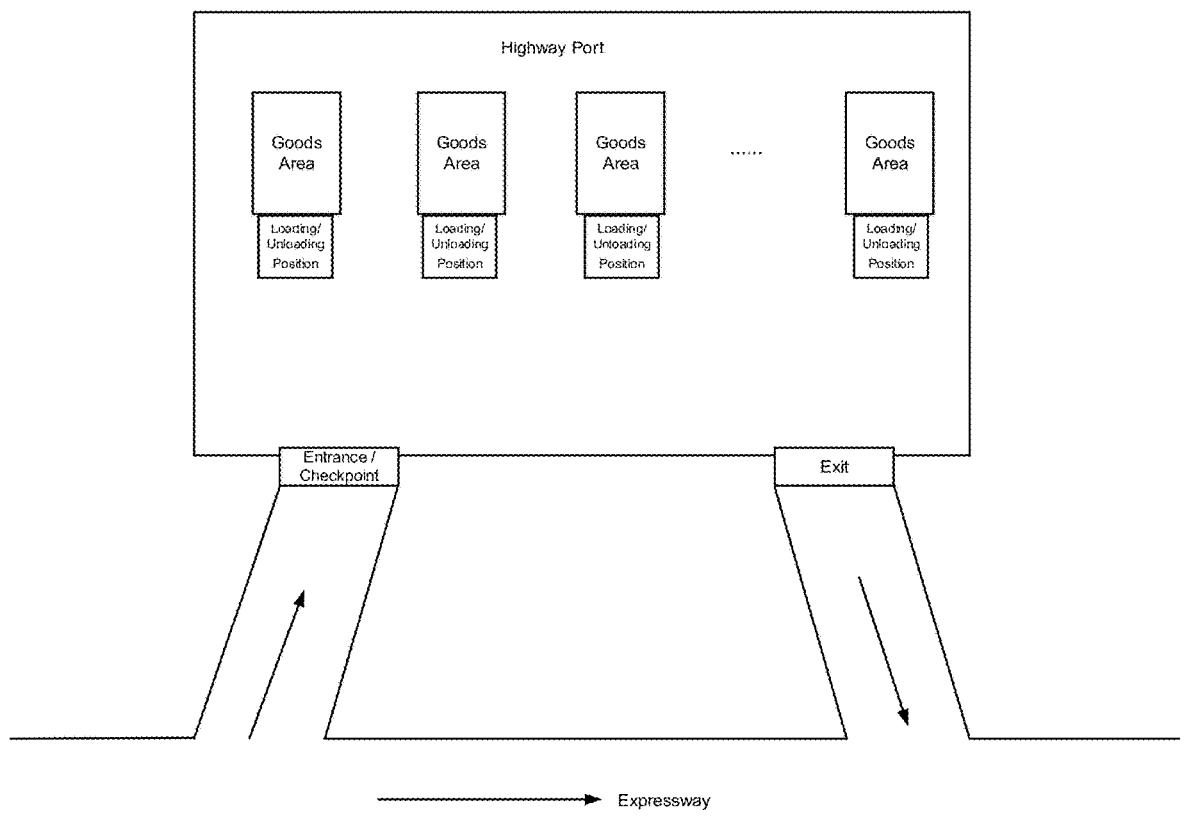
FIG. 3 is a second schematic diagram showing a structure of a highway port according to an embodiment of the present disclosure.

In an example, as shown in FIG. 3, the highway port has an entrance, an exit and a plurality of loading/unloading positions (the loading/unloading positions are numbered accordingly, with goods piled around the loading/unloading positions, the goods being carried in containers or scattered). The vehicle is controlled to autonomously move from the checkpoint position to a specified loading/unloading position in a target highway port, so as to load/unload goods at the loading/unloading position.

Preferably, in an embodiment of the present disclosure, the checkpoint of the highway port can be an autonomous checkpoint which is controlled to open or close by a corresponding checkpoint controller 13, so as to give or not to give the vehicle a clearance. The checkpoint can be a road block, an electrical retractable door, an electrical sliding door, or the like, and the present disclosure is not limited thereto.

In an embodiment of the present disclosure, the vehicle controller 12 can interact with the checkpoint controller 13 corresponding to the position of the checkpoint for autonomously passing the checkpoint as follows. The checkpoint controller 13 can obtain vehicle identification information of the vehicle, verify the vehicle identification information, and control the checkpoint to give a clearance to the vehicle when the vehicle identification information is successfully verified. Upon determining that the checkpoint has given the clearance, the vehicle controller 12 can control the vehicle to start and pass the position of the checkpoint.

The vehicle controller 12 determining that the checkpoint has given the clearance may include: the vehicle controller 12 determining that the checkpoint has given the clearance in response to receiving an allow-to-pass instruction transmitted from the checkpoint controller 13; or the vehicle controller 12 detecting whether the checkpoint has given the clearance using a vehicle-mounted sensor, and determining that the checkpoint has given the clearance in response to detecting such clearance.

The vehicle controller 12 detecting whether the checkpoint has given the clearance using the vehicle-mounted sensor may include: the vehicle controller 12 determining that the checkpoint has given the clearance in response to determining from an image or point cloud data transmitted from the vehicle-mounted sensor that the checkpoint is in a state of clearance.

The checkpoint controller 13 can obtain the vehicle identification information of the vehicle by using any of the following schemes (Schemes A1~A2), as non-limiting examples.

In Scheme A1, the checkpoint controller 13 can actively recognize the vehicle identification information of the vehicle.

In particular, Scheme A1 can be implemented in any of the following two schemes, as non-limiting examples.

In Scheme A11, the checkpoint controller 13 can control a sensor to capture an image of the vehicle, and apply an image recognition process to the captured image to obtain the vehicle identification information of the vehicle.

The sensor can be a camera which can be installed near the position of the checkpoint and can have its lens facing the position where the vehicle is stopped. For example, it can be installed on the checkpoint, on the checkpoint controller, or on a fixed object near the position of the checkpoint. The angle of the camera lens can be adjusted autonomously.

The checkpoint controller 13 can process the image transmitted from the camera, and if the vehicle identification information is recognized from the image, verify the vehicle identification information. If no vehicle identification information is recognized from the image, the capturing angle of the camera can be adjusted autonomously and the above actions can then be repeated, until the vehicle identification information is recognized.

The checkpoint controller 13 can recognize the vehicle identification information from the image as follows. The checkpoint controller 13 can extract one or more features from the image, compare the extracted one or more features with predetermined one or more features corresponding to the vehicle identification information, and determine the vehicle identification information based on the matched one or more features. In an embodiment of the present disclosure, the above vehicle identification information can be information uniquely associated with the vehicle, e.g., a license plate number. When the vehicle identification information is a license plate number, one or more features corresponding to the vehicle identification information may include a size, a shape (a rectangular frame), a color (blue or black), a text feature (a length of a text string within the rectangular frame), or the like.

In Scheme A12, the checkpoint controller 13 can control a sensor to scan a Quick Response (QR) code or a barcode on the vehicle to obtain the vehicle identification information of the vehicle.

In an embodiment of the present disclosure, the QR code or barcode containing the vehicle identification information can be affixed to or printed on a specific position (e.g., a front windshield or a left plate) of the vehicle in advance.

The sensor can be a camera which can be installed near the position of the checkpoint and can have its lens facing the position where the vehicle is stopped. For example, it can be installed on the checkpoint, on the checkpoint controller, or on a fixed object near the position of the checkpoint. The angle of the camera lens can be adjusted autonomously. The checkpoint controller 13 can adjust the capturing angle of the camera, until the QR code or barcode can be successfully scanned.

In Scheme A2, the checkpoint controller 13 can receive the vehicle identification information of the vehicle from the vehicle controller 12.

In specific examples, the vehicle controller 12 can interact with the checkpoint controller 13 corresponding to the position of the checkpoint for autonomously passing the checkpoint by using any of the following schemes (Schemes B1~B3), as non-limiting examples.

In Scheme B1, the vehicle controller 12 and the checkpoint controller 13 can exchange information with each other in a bidirectional manner. The vehicle controller 12 can transmit the vehicle identification information to the checkpoint controller 13 and, in response to receiving an allow-to-pass instruction transmitted from the checkpoint controller 13, control the vehicle to start and enter the target highway port. The checkpoint controller 13 can verify the vehicle identification information, give a clearance to the vehicle when the vehicle identification information is successfully verified, and transmit the allow-to-pass instruction to the vehicle controller 12.

In an embodiment of the present disclosure, the vehicle identification information can be identity information uniquely corresponding to the vehicle, e.g., a license plate number or a vehicle identification number of the vehicle.

The vehicle controller 12 and the checkpoint controller 13 can communicate with each other via a Local Area Network (LAN) within the highway port or a base station, or using Bluetooth, WiFi or other communication schemes.

In Scheme B2, the vehicle controller 12 can communicate information to the checkpoint controller 13 in a unidirectional manner. The vehicle controller 12 can transmit the vehicle identification information to the checkpoint controller 13 and, upon determining that the checkpoint controller 13 has given the clearance, control the vehicle to start and pass the position of the checkpoint. Accordingly, the checkpoint controller 13 can verify the vehicle identification information, and give a clearance to the vehicle when the vehicle identification information is successfully verified.

In Scheme B2, the vehicle controller 12 can detect whether the checkpoint in the front is in the state of clearance based on information transmitted from a vehicle-mounted sensor (e.g., a camera, a laser radar, a millimeter wave radar, or the like). If so, the vehicle controller 12 determines that the checkpoint controller 13 has given the clearance; or otherwise the vehicle controller 12 determines that the checkpoint controller 13 has not given the clearance. For example, when the checkpoint is a road block, it can determine that the clearance has been given upon detecting that the road block is lifted. When the checkpoint is an electrical retractable door or sliding door, it can determine that the clearance has been given upon detecting that the electrical retractable door or sliding door has moved to one side or two sides and there is no further block behind the door.

In Scheme B3, the vehicle controller 12 and the checkpoint controller 13 do not exchange information with each other. The checkpoint controller 13 can recognize the vehicle identification information of the vehicle, verify the vehicle identification information, and give a clearance to the vehicle when the vehicle identification information is successfully verified. The vehicle controller 12 can control the vehicle to start and enter the target highway port upon determining that the checkpoint controller 13 has given the clearance.

In an embodiment of the present disclosure, the checkpoint controller 13 can verify the vehicle identification information by using any of the following schemes (Schemes C1~C3), as non-limiting examples.

In Scheme C1, the vehicle identification information of each vehicle that is allowed to pass can be pre-stored in the checkpoint controller 13. The checkpoint controller 13 can match the obtained vehicle identification information with the pre-stored vehicle identification information of each vehicle that is allowed to pass, and determine that the vehicle identification information is successfully verified when the obtained vehicle identification information is successfully match with the pre-stored vehicle identification information.

In Scheme C2, a pass rule can be pre-stored in the checkpoint controller 13. The checkpoint controller 13 can determine whether the obtained vehicle identification information conforms to the pass rule, and determine that the vehicle identification information is successfully verified when the obtained vehicle identification information conforms to the pass rule.

The pass rule may include, but not limited to, the following: a type of the vehicle conforming to a predetermined vehicle type, a license plate number of the vehicle conforming to a particular geographical area or registered information for the vehicle identification information, or the like.

For example, the pass rule may include: allowing vehicles of the type "passenger car" to pass, allowing vehicles of the type "truck" to pass, allowing vehicles of the type "motor vehicle" to pass, allowing vehicles having local license plate numbers to pass, or allowing vehicles having registered license plate numbers to pass, to name a few. More examples will be omitted here.

In Scheme C3, the checkpoint controller 13 can transmit the obtained vehicle identification information to a remote server, which then verifies the vehicle identification information, and receive an identification verification result for the vehicle identification information from the server.

In Scheme C3, the server can verify the vehicle identification information by using Scheme C1 or C2, and further details thereof will be omitted here.

The vehicle controller 12 can determine whether the checkpoint has given the clearance by using any of the following schemes (Schemes D1~D2), as non-limiting examples.

In Scheme D1, the vehicle controller 12 can determine that the checkpoint has given the clearance in response to receiving an allow-to-pass instruction transmitted from the checkpoint controller 13. That is, the checkpoint controller 13 can transmit the allow-to-pass instruction the vehicle controller 12 when vehicle identification information is successfully verified.

In Scheme D2, the vehicle controller 12 can detect whether the checkpoint has given the clearance using a vehicle-mounted sensor, and determine that the checkpoint has given the clearance in response to detecting such clearance.

In particular, in an example, in Scheme D2, a correspondence between types of checkpoints and their respective states of clearance can be pre-stored in the vehicle controller 12. The type and state of the checkpoint can be determined from an image or point cloud data transmitted from the vehicle-mounted sensor, and the state can be matched with each state of clearance corresponding to the type of the checkpoint in the correspondence. It can be determined that the checkpoint has given the clearance when the state is successfully matched with the state of clearance.

For example, when the type of the checkpoint is road block, its state of clearance can be the road block being lifted. When the type of the checkpoint is electrical retractable door, its state of clearance can be a retracted state. When the type of the checkpoint is electrical sliding door, its state of clearance can be an open state, to name a few. More examples will be omitted here.

Figure 4:
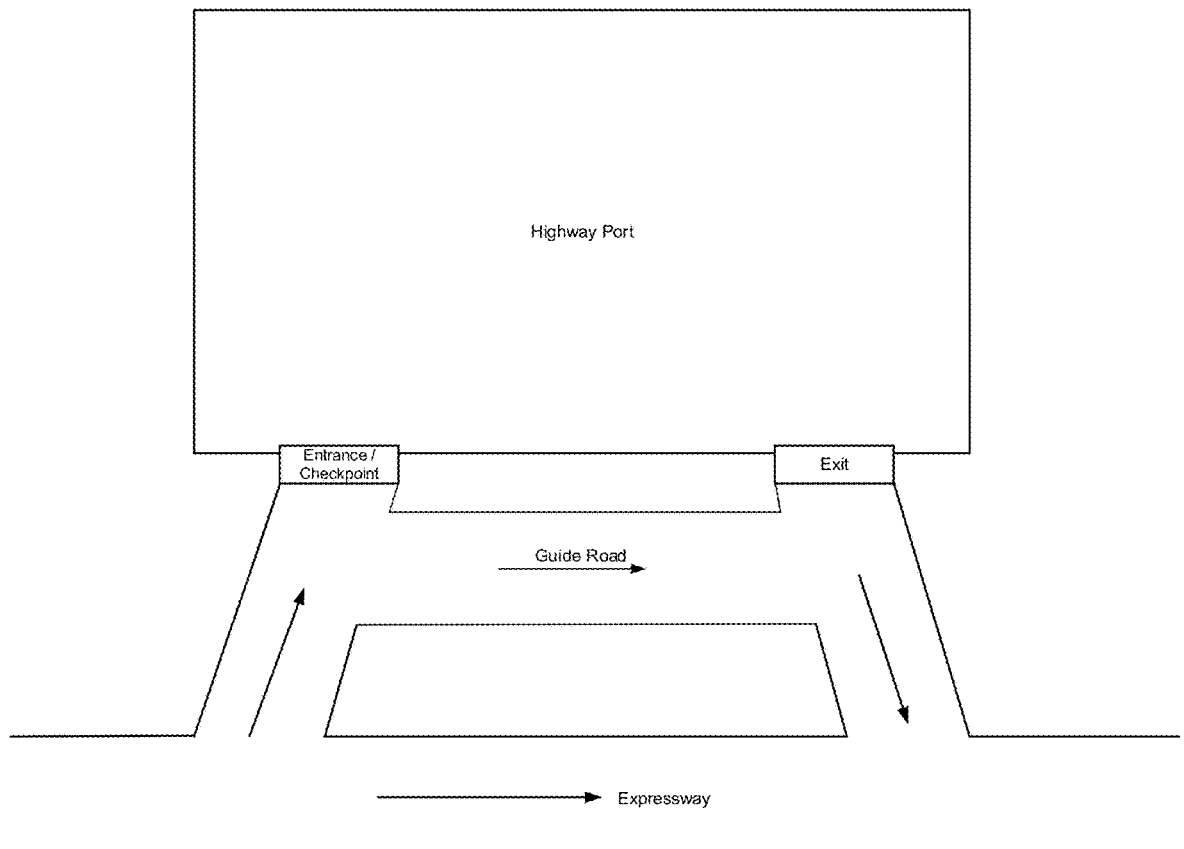
FIG. 4 is a third schematic diagram showing a structure of a highway port according to an embodiment of the present disclosure.

There may be vehicles accidentally entering the highway port in practice. Preferably, in order to guide such vehicles to leave the highway port better and faster, as shown in FIG. 4, a guide road for leaving the highway port can be provided at the entrance of the highway port. The checkpoint controller 13 can guide the vehicle to leave the highway port via a guide road when the vehicle identification information of the vehicle is not successfully verified. In an example, the checkpoint controller 13 can be further configured to transmit to the vehicle controller 12 first instruction information indicating that the vehicle is not allowed to pass and instructing the vehicle to leave the position of the checkpoint via a guide road, when the vehicle identification information is not successfully verified. Accordingly, the vehicle controller 12 can be further configured to control the vehicle to start and leave the position of the checkpoint in response to receiving the first instruction information.

Figure 5A:
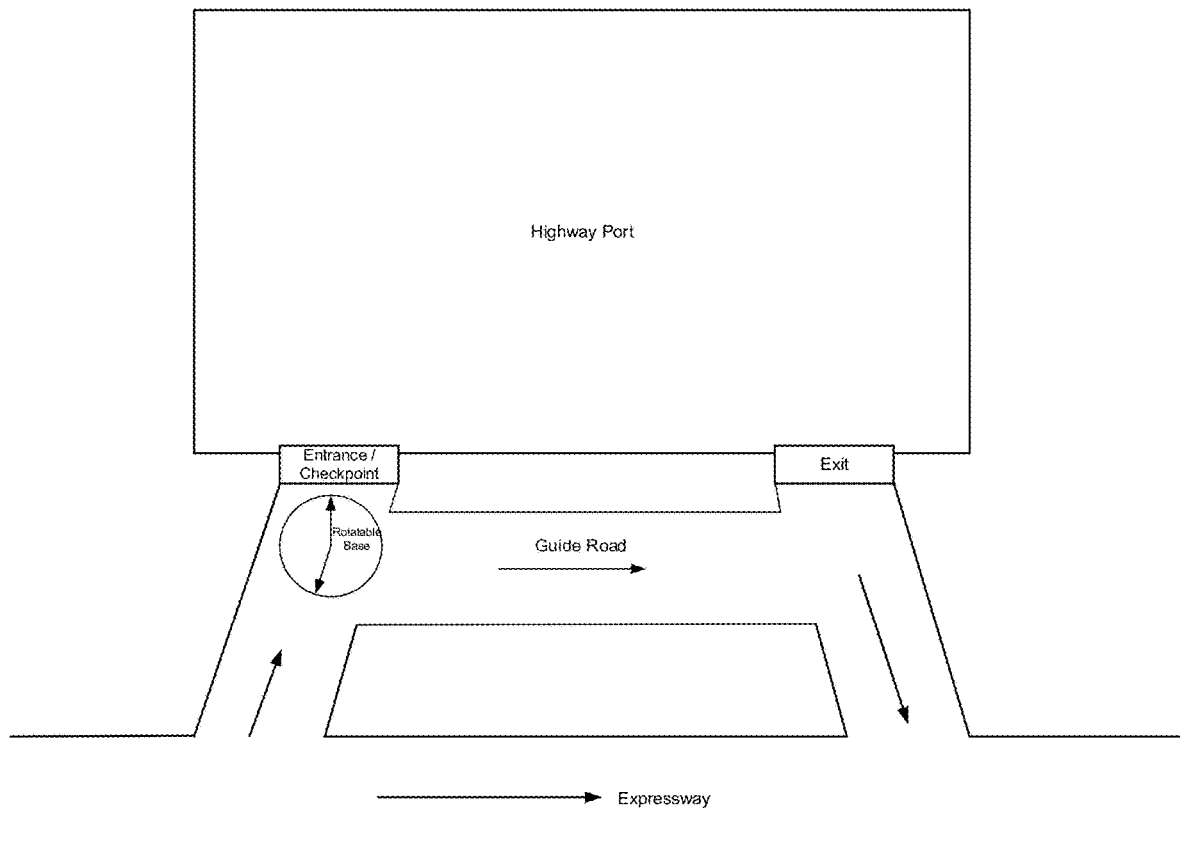
FIG. 5A is a first schematic diagram showing a checkpoint position configured as a rotatable base according to an embodiment of the present disclosure.
Figure 5B:
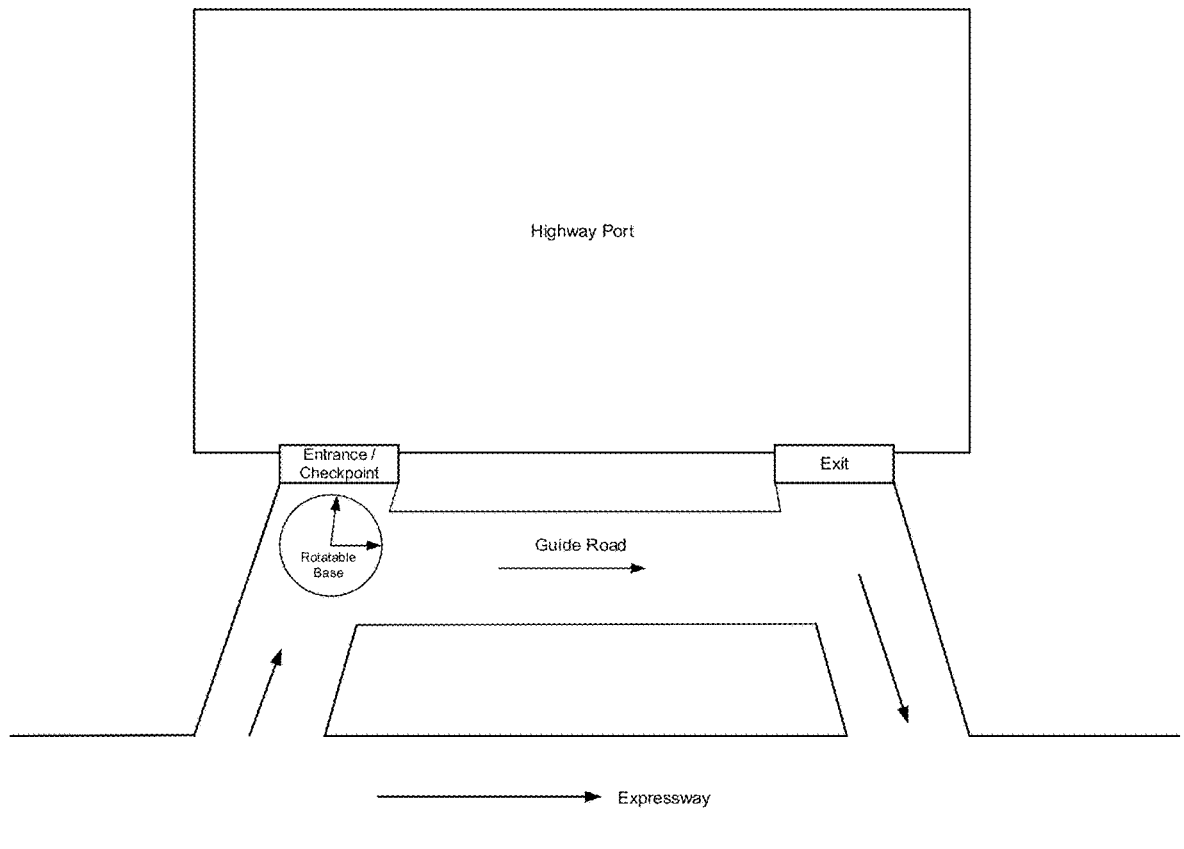
FIG. 5B is a second schematic diagram showing a checkpoint position configured as a rotatable base according to an embodiment of the present disclosure.

In an example, according to an embodiment of the present disclosure, the position of the checkpoint can be configured as a rotatable base. The checkpoint controller 13 can control the rotatable base to rotate clockwise or counterclockwise to stop at two directions, one for entering the highway port (e.g., facing the checkpoint) and the other one for leaving the highway port. The direction for leaving the highway port can face away from the checkpoint, as shown in FIG. 5A, or can face the direction of the guide road, as shown in FIG. 5B. Thus, the checkpoint controller 13 can be further configured to transmit to the vehicle controller 12 second instruction information indicating that the vehicle is not allowed to pass, and rotate the rotatable base such that the vehicle is heading away from the position of the checkpoint, when the vehicle identification information is not successfully verified. Accordingly, the vehicle controller 12 can be further configured to control the vehicle to start and leave the position of the checkpoint in response to receiving the second instruction information.

Preferably, in an embodiment of the present disclosure, the vehicle controller 12 controlling the vehicle to autonomously move to the position of the checkpoint at the entrance to the target highway port may include: the vehicle controller 12 planning a route from a current position to the position of the checkpoint and controlling the vehicle to autonomously move along the route; and the vehicle controller 12 controlling the vehicle to stop in response to determining from an image or point cloud data transmitted from a vehicle-mounted sensor that an obstacle in the front is a checkpoint and the distance from the vehicle to the checkpoint is smaller than or equal to a distance threshold. The distance threshold can be an empirical value, or can be calculated based on a moving speed and an inertia of the vehicle, i.e., the distance threshold can be a distance the vehicle covers from braking to stopping.

The vehicle controller 12 can plan the route from the current position to the position of the checkpoint by using map software or navigation software on the vehicle side.

In an example, the vehicle controller 12 controlling the vehicle to autonomously move from the position of the checkpoint to the specified loading/unloading position in the target highway port may include: planning a first route from the position of the checkpoint to the loading/unloading position and controlling the vehicle to autonomously move to the loading/unloading position along the first route.

In an example, the vehicle controller 12 can be further configured to: plan a second route from the loading/unloading position to an exit after the loading/unloading has completed, and control the vehicle to autonomously move to the exit along the second route and leave the target highway port.

Embodiment 2

The highway port in Embodiment 2 differs from the highway port in Embodiment 1 in that a weighing position and a charging position are added. A corresponding ground scale sensor is provided at the weighing position, and the vehicle controller 12 can interact with the ground scale sensor for autonomous weighing at the weighing position. A corresponding charging terminal is provided at the charging position, and the vehicle controller 12 can interact with the charging terminal for autonomous charging at the charging position. After controlling the vehicle to autonomously pass the checkpoint, the vehicle controller 12 can control the vehicle to pass the weighing position and the charging position sequentially during its movement from the position of the checkpoint to the loading/unloading position.

Figure 6:
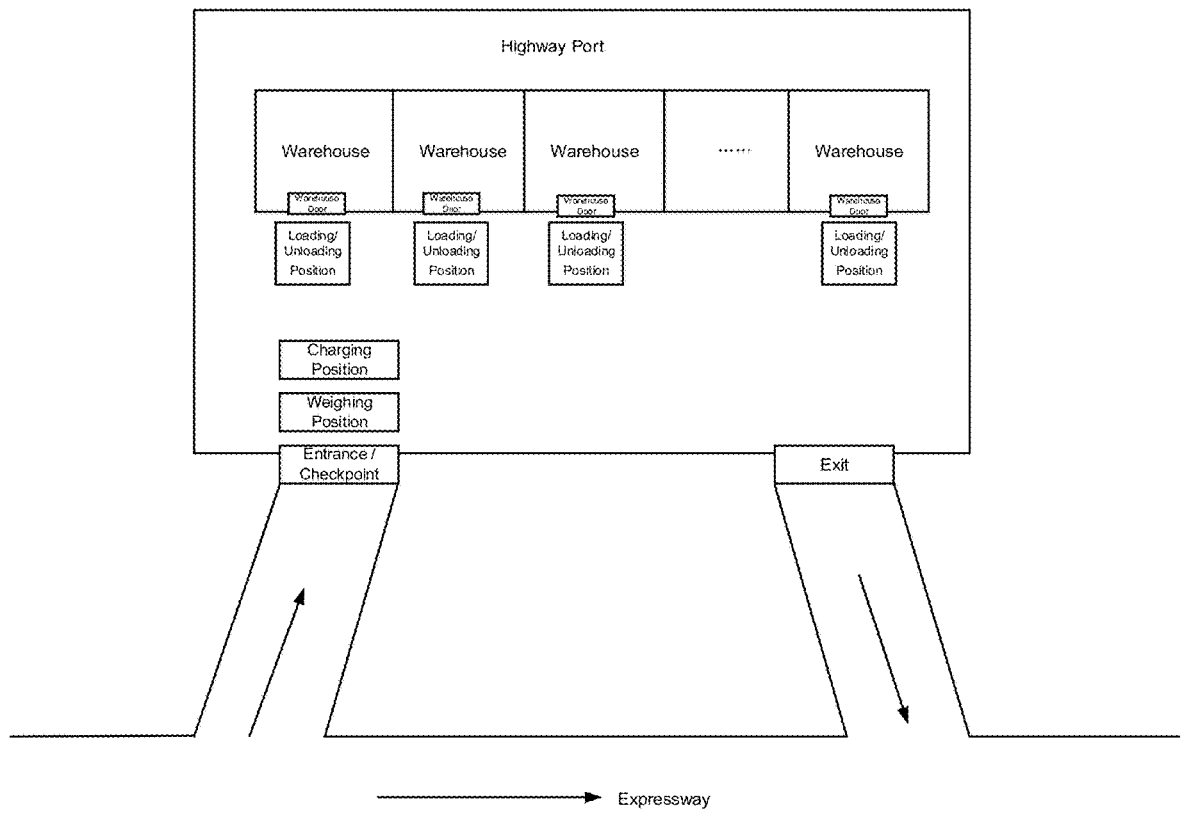
FIG. 6 is a fourth schematic diagram showing a structure of a highway port according to an embodiment of the present disclosure.

FIG. 6 shows a highway port in which a weighing position and a charging position are added to the highway port shown in FIG. 2.

Figure 7:
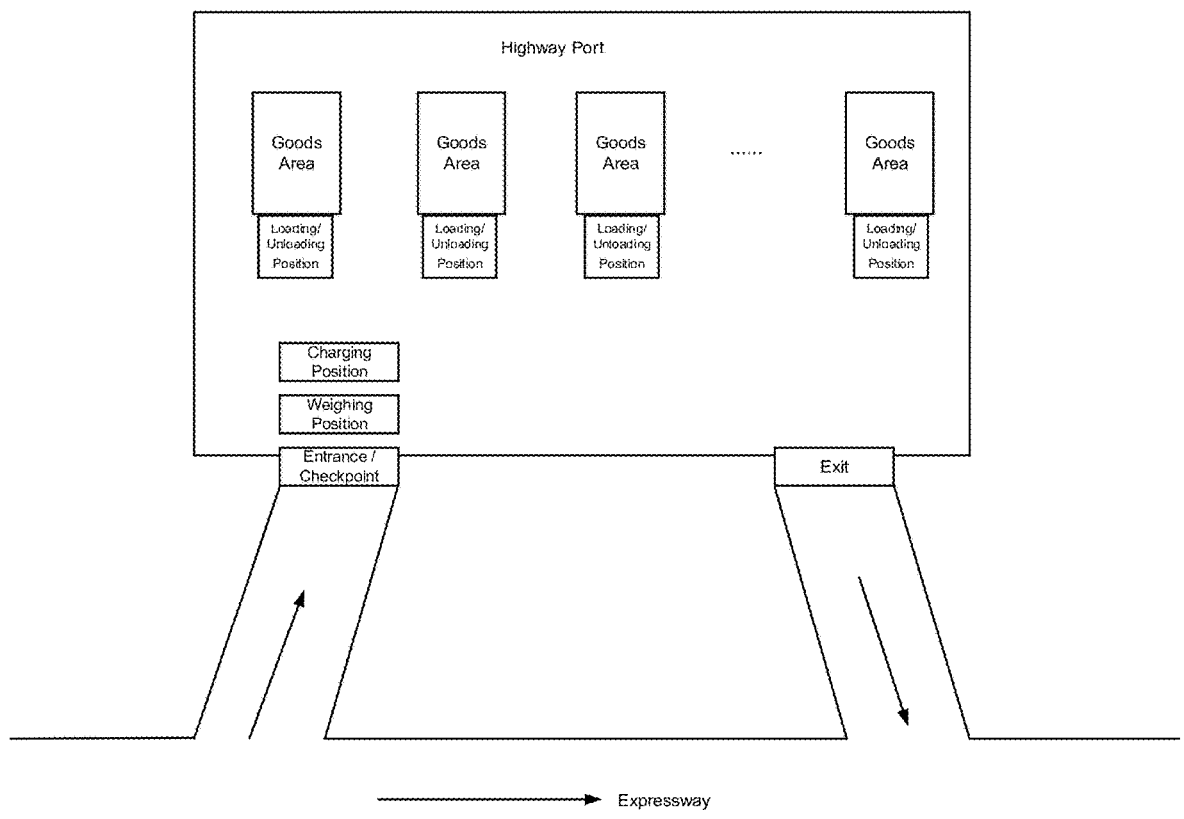
FIG. 7 is a fifth schematic diagram showing a structure of a highway port according to an embodiment of the present disclosure.

FIG. 7 shows a highway port in which a weighing position and a charging position are added to the highway port shown in FIG. 3.

In Embodiment 2 of the present disclosure, for details of the implementation for the vehicle controller 12 to interact with the checkpoint controller 13 at the position of the checkpoint for autonomously passing the checkpoint, reference can be made to Embodiment 1 and description thereof will be omitted here.

In Embodiment 2 of the present disclosure, the vehicle controller 12 controlling the vehicle to autonomously move from the position of the checkpoint to the specified loading/unloading position in the target highway port may include: controlling the vehicle to autonomously move from the position of the checkpoint to a weighing position, and interacting with a ground scale sensor 15 corresponding to the weighing position for autonomous weighing at the weighing position; controlling the vehicle to autonomously move from the weighing position to a charging position, and interacting with a charging terminal 16 corresponding to the charging position for autonomous charging at the charging position; and controlling the vehicle to autonomously move from the charging position to the loading/unloading position.

In Embodiment 2 of the present disclosure, the vehicle controller 12 can interact with the ground scale sensor 15 corresponding to the weighing position for autonomous weighing at the weighing position as follows. The ground scale sensor 15 can weigh the vehicle in response to sensing that the vehicle is stopping at the weighing position, and transmit weighing completion information to the vehicle controller 12. The vehicle controller 12 can control the vehicle to start and leave the weighing position in response to receiving the weighing completion information.

In an example, the ground scale sensor 15 can be further configured to obtain vehicle identification information of the vehicle and transmit a weighing result in association with the vehicle identification information to the charging terminal 16.

The ground scale sensor 15 obtaining vehicle identification information of the vehicle may include: the ground scale sensor 15 recognizing the vehicle identification information of the vehicle; or the ground scale sensor 15 receiving the vehicle identification information from the vehicle controller 12.

The vehicle controller 12 can interact with the ground scale sensor 15 corresponding to the weighing position for autonomous weighing at the weighing position by using any of the following schemes (Schemes E1~E2), as non-limiting examples.

In Scheme E1, the vehicle controller 12 can transmit the vehicle identification information to the ground scale sensor 15, and control the vehicle to start and leave the weighing position in response to receiving the weighing completion information transmitted from the ground scale sensor 15. Accordingly, the ground scale sensor 15 can weigh the vehicle, transmit the weighing result in association with the vehicle identification information to the charging terminal 16, and transmit the weighing completion information to the vehicle controller 12.

In Embodiment 2, the vehicle controller 12 and the ground scale sensor 15 can communicate with each other via a LAN within the highway port or a base station, or using Bluetooth, WiFi or other communication schemes, and the present disclosure is not limited thereto.

In Scheme E2, the ground scale sensor 15 can recognize the vehicle identification information of the vehicle, weigh the vehicle, transmit the weighing result in association with the vehicle identification information to the charging terminal 16, and transmit the weighing completion information to the vehicle controller 12. Accordingly, the vehicle controller 12 can control the vehicle to start and leave the weighing position in response to receiving the weighing completion information transmitted from the ground scale sensor 15.

The ground scale sensor 15 can recognize the vehicle identification information of the vehicle by using any of the following schemes (Schemes F1~F2), as non-limiting examples.

In Scheme F1, the ground scale sensor 15 can control a sensor to capture an image of the vehicle, and apply an image recognition process to the captured image to obtain the vehicle identification information of the vehicle.

The sensor can be a camera which can be installed near the weighing position and can have its lens facing the weighing position. For example, it can be installed on a fixed object near the weighing position. The angle of the camera lens can be adjusted autonomously.

The ground scale sensor 15 can process the image transmitted from the camera, and if the vehicle identification information is recognized from the image, verify the vehicle identification information. If no vehicle identification information is recognized from the image, the capturing angle of the camera can be adjusted autonomously and the above actions can then be repeated, until the vehicle identification information is recognized.

The ground scale sensor 15 can recognize the vehicle identification information from the image as follows. The ground scale sensor 15 can extract one or more features from the image, compare the extracted one or more features with predetermined one or more feature corresponding to the vehicle identification information, and determine the vehicle identification information based on the matched features. In an embodiment of the present disclosure, the above vehicle identification information can be information uniquely associated with the vehicle, e.g., a license plate number. When the vehicle identification information is a license plate number, one or more features corresponding to the vehicle identification information may include a size, a shape (a rectangular frame), a color (blue or black), a text feature (a length of a text string within the rectangular frame), or the like.

In Scheme F2, the ground scale sensor 15 can control a sensor to scan a QR code or a barcode on the vehicle to obtain the vehicle identification information of the vehicle.

In an embodiment of the present disclosure, the QR code or barcode containing the vehicle identification information can be affixed to or printed on a specific position (e.g., a front windshield, a left plate, or a chassis) of the vehicle in advance.

The ground scale sensor 15 can adjust the capturing angle of the camera, until the QR code or barcode can be successfully scanned.

In Embodiment 2, the vehicle controller 12 can interact with the charging terminal 16 corresponding to the charging position for autonomous charging at the charging position as follows. The charging terminal 16 can obtain vehicle identification information of the vehicle.

The charging terminal 16 can obtain a weighing result and a covered mileage corresponding to the vehicle identification information, and calculate an amount to be charged based on the weighing result and the covered mileage. The charging terminal can transmit leaving instruction information to the vehicle controller 12 after determining that the vehicle controller 12 has paid the amount to be charged. The vehicle controller 12 can control the vehicle to start and leave the charging position in response to receiving the leaving instruction information.

In an example, the charging terminal 16 can be further configured to transmit the amount to be charged to the vehicle controller 12. The vehicle controller 12 can be further configured to autonomously pay the amount to be charged in response to receiving the amount to be charged. The charging terminal 16 determining that the vehicle controller has paid the amount to be charged may include: the charging terminal 16 determining that the vehicle controller has paid the amount to be charged in response to successfully receiving the amount paid by the vehicle controller.

The vehicle controller 12 autonomously paying the amount to be charged in response to receiving the amount to be charged may include: the vehicle controller 12 paying the amount to be charged using third-party payment software, or the vehicle controller 12 controlling a vehicle-mounted camera to scan a QR code corresponding to the charging terminal and paying the amount to be charged using third-party payment software.

In another example, the charging terminal 16 can be further configured to bill an account corresponding to the vehicle identification information for the amount to be charged, or deduct the amount to be charged from an ETC corresponding to the vehicle identification information. The charging terminal 16 determining that the vehicle controller 12 has paid the amount to be charged may include: the charging terminal 16 determining that the vehicle controller 12 has paid the amount to be charged in response to successfully billing the account for the amount to be charged or successfully deducting the amount to be charged from the ETC.

The vehicle controller 12 can interact with the charging terminal 16 corresponding to the charging position for autonomous charging by using any of the following schemes (Schemes G1~G4), as non-limiting examples.

In Scheme G1, the vehicle controller 12 can autonomously pay the amount to be charged in response to receiving the amount to be charged as transmitted from the charging terminal 16, and control the vehicle to start and leave the charging position in response to receiving the leaving instruction information transmitted from the charging terminal 16. Accordingly, the charging terminal 16 can obtain the vehicle identification information of the vehicle, obtain the weighing result and the covered mileage corresponding to the vehicle identification information, calculate the amount to be charged based on the weighing result and the covered mileage, transmit the amount to be charged to the vehicle controller 12, receive the amount paid by the vehicle controller 12, and transmit the leaving instruction information to the vehicle controller 12.

In Scheme G2, the vehicle controller 12 can transmit the vehicle identification information to the charging terminal 16, autonomously pay the amount to be charged in response to receiving the amount to be charged as transmitted from the charging terminal 16, and control the vehicle to start and leave the charging position in response to receiving the leaving instruction information transmitted from the charging terminal 16. Accordingly, the charging terminal 16 can obtain the weighing result and the covered mileage corresponding to the vehicle identification information, calculate the amount to be charged based on the weighing result and the covered mileage, transmit the amount to be charged to the vehicle controller 12, receive the amount paid by the vehicle controller 12, and transmit the leaving instruction information to the vehicle controller 12.

In Schemes G1 and G2, the vehicle controller 12 autonomously paying the amount to be charged in response to receiving the amount to be charged as transmitted from the charging terminal may include: the vehicle controller 12 controlling a vehicle-mounted camera to scan a QR code corresponding to the charging terminal 16 and paying the amount to be charged using third-party payment software. Accordingly, the charging terminal 16 receiving the amount paid by the vehicle controller 12 may include: receiving the amount using the third-party payment software.

In Scheme G3, the vehicle controller 12 can control the vehicle to start and leave the charging position in response to receiving the leaving instruction information transmitted from the charging terminal 16. Accordingly, the charging terminal 16 can obtain the vehicle identification information of the vehicle, obtain the weighing result and the covered mileage corresponding to the vehicle identification information, calculate the amount to be charged based on the weighing result and the covered mileage, bill the account corresponding to the vehicle identification information for the amount to be charged or deduct the amount to be charged from the ETC corresponding to the vehicle identification information, and transmit the leaving instruction information to the vehicle controller 12.

In Scheme G4, the vehicle controller 12 can transmit the vehicle identification information to the charging terminal 16, and control the vehicle to start and leave the charging position in response to receiving the leaving instruction information transmitted from the charging terminal 16. Accordingly, the charging terminal 16 can obtain the weighing result and the covered mileage corresponding to the vehicle identification information, calculate the amount to be charged based on the weighing result and the covered mileage, bill the account corresponding to the vehicle identification information for the amount to be charged or deduct the amount to be charged from the ETC corresponding to the vehicle identification information, and transmit the leaving instruction information to the vehicle controller 12.

In Schemes G3 and G4, after calculating the amount to be charged, the charging terminal 16 can directly bill the account of the payer for the amount to be charged. The charging terminal 16 can transmit bills to the payer periodically (e.g., per month, per season, per half year or per year) such that the payer can pay the corresponding fee. The payer can be e.g., a driver of the vehicle or a transportation companying to which the vehicle belongs.

In another example, a correspondence between vehicle identification information and ETCs of respective vehicles can be pre-stored at the charging terminal 16. When the vehicle passes the charging terminal 16, the charging terminal 16 can deduct the amount to be paid currently from the ETC corresponding to the vehicle identification information of the vehicle.

In an embodiment of the present disclosure, the charging terminal 16 can calculate the amount to be charged based on the weighing result and the covered mileage as follows. A road rate schedule, which specifies fees to be charged for various types of vehicles having different weights on respective roads per kilometer, can be pre-stored in the charging terminal 16. The charging terminal 16 can calculate the fee to be charged for the vehicle per kilometer based on the obtained weighing result, the type of the vehicle and the road used, and then obtain the amount to be charged as a product of the fee to be charged per kilometer and the covered mileage (in units of kilometers).

For example, the rate schedule for a truck over 15 tons on various expressways can be as follows:

1) 2 CNY per kilometer on G1 Jing-Ha Expressway, G6 Jing-Zang Expressway, G7 Jing-Xin Expressway, G45 Da-Guang Expressway, G4501 $6^{th}$ Ring, G101 Tong-Yan Expressway, G106 Jing-Guang Expressway, S15 Jing-Jin Expressway, S36 Airport North, or S46 Jing-PING Expressway;

2) 0.81 CNY per kilometer on G2 Jing-Hu Expressway;

3) 2.5 CNY per kilometer on G4 Jing-HK-Macao Expressway; and 4) 2 CNY per kilometer on G103 Jing-Tang Expressway or S12 Airport Expressway.

In an embodiment of the present disclosure, the charging terminal 16 can obtain the vehicle identification information of the vehicle by using any of the following schemes (Schemes H1~H2), as non-limiting examples.

In Scheme H1, the charging terminal 16 can recognize the vehicle identification information of the vehicle.

In Scheme H2, the charging terminal 16 can receive the vehicle identification information of the vehicle from the vehicle controller 12.

The vehicle controller 12 and the charging terminal 16 can communicate with each other via a base station, or using Bluetooth, WiFi or other communication schemes, and the present disclosure is not limited thereto.

In particular, Scheme H1 can be implemented using any of the following Scheme H11 or H12, as non-limiting examples.

In Scheme H11, the charging terminal 16 can control a sensor to capture an image of the vehicle, and apply an image identification process to the captured image to obtain the vehicle identification information of the vehicle.

The sensor can be a camera which can be installed near the charging position and can have its lens facing the charging position. For example, it can be installed on a fixed object near the charging position. The angle of the camera lens can be adjusted autonomously.

The charging terminal 16 can process the image transmitted from the camera, and if the vehicle identification information is recognized from the image, verify the vehicle identification information. If no vehicle identification information is recognized from the image, the capturing angle of the camera can be adjusted autonomously and the above actions can then be repeated, until the vehicle identification information is recognized.

The charging terminal 16 can recognize the vehicle identification information from the image as follows. The charging terminal 16 can extract one or more features from the image, compare the extracted one or more features with predetermined one or more features corresponding to the vehicle identification information, and determine the vehicle identification information based on the matched features. In an embodiment of the present disclosure, the above vehicle identification information can be information uniquely associated with the vehicle, e.g., a license plate number. When the vehicle identification information is a license plate number, one or more features corresponding to the vehicle identification information may include a size, a shape (a rectangular frame), a color (blue or black), a text feature (a length of a text string within the rectangular frame), or the like.

In Scheme H12, the charging terminal 16 can control a sensor to scan a QR code or a barcode on the vehicle to obtain the vehicle identification information of the vehicle.

In an embodiment of the present disclosure, the QR code or barcode containing the vehicle identification information can be affixed to or printed on a specific position (e.g., a front windshield or a left plate) of the vehicle in advance. The charging terminal can adjust the capturing angle of the camera, until the QR code or barcode can be successfully scanned.

In an embodiment of the present disclosure, the vehicle controller 12 can interact with the loading/unloading control apparatus for autonomous loading/unloading at the loading/unloading position as follows. The loading/unloading control apparatus 14 can obtain vehicle identification information of the vehicle, verify the vehicle identification information, control a loading/unloading machine to load/unload goods when the vehicle identification information is successfully verified, and transmit a loading/unloading completion indication to the vehicle controller 12 when the loading/unloading has completed. Upon receiving the loading/unloading completion indication, the vehicle controller 12 can control the vehicle to leave the loading/unloading position.

In an embodiment of the present disclosure, the loading/unloading control apparatus 14 can obtain vehicle identification information of the vehicle by using any of the following schemes (Schemes I1~I3), as non-limiting examples.

In Scheme I1, the loading/unloading control apparatus 14 can receive the vehicle identification information from the vehicle controller 12. That is, the vehicle controller 12 can actively transmit the vehicle identification information to the loading/unloading control apparatus 14.

In Scheme I2, the loading/unloading control apparatus 14 can control a sensor to capture an image of the vehicle, and apply an image recognition process to the captured image to obtain the vehicle identification information of the vehicle.

The sensor can be a camera which can be installed near the loading/unloading control apparatus or the loading/unloading position. For example, it can be installed on a fixed object (e.g., on a streetlight, next to a road, on a tree, on a warehouse door, or on a gantry crane) near the loading/unloading position. The angle of the camera lens can be adjusted autonomously.

The loading/unloading control apparatus 14 can process the image transmitted from the camera, and if the vehicle identification information is recognized from the image, verify the vehicle identification information. If no vehicle identification information is recognized from the image, the capturing angle of the camera can be adjusted autonomously and the above actions can then be repeated, until the vehicle identification information is recognized.

The loading/unloading control apparatus 14 can recognize the vehicle identification information from the image as follows. The loading/unloading control apparatus 14 can extract one or more features from the image, compare the extracted one or more features with predetermined one or more features corresponding to the vehicle identification information, and determine the vehicle identification information based on the matched features. In an embodiment of the present disclosure, the above vehicle identification information can be information uniquely associated with the vehicle, e.g., a license plate number or a vehicle identification number (which can be identity information allocated to the vehicle by the operation system). When the vehicle identification information is a license plate number, features corresponding to the vehicle identification information may include a size, a shape (a rectangular frame), a color (blue or black), a text feature (a length of a text string within the rectangular frame), or the like.

In Scheme I3, the loading/unloading control apparatus 14 can control a sensor to scan a QR code or a barcode on the vehicle to obtain the vehicle identification information of the vehicle.

In an embodiment of the present disclosure, the QR code or barcode containing the vehicle identification information can be affixed to or printed on a specific position (e.g., a front windshield or a left plate) of the vehicle in advance. The loading/unloading control apparatus can adjust the capturing angle of the camera, until the QR code or barcode can be successfully scanned.

In an embodiment of the present disclosure, the loading/unloading control apparatus 14 can verify the vehicle identification information as follows. A list of vehicle identification information can be pre-stored in the loading/unloading control apparatus 14. The loading/unloading control apparatus 14 can match the vehicle identification information with the list of vehicle identification information and determine that the vehicle identification information is successfully verified when the vehicle identification information successfully matches the list of vehicle identification information; or otherwise determine that the vehicle identification information is not successfully verified. Alternatively, the loading/unloading control apparatus 14 can transmit the vehicle identification information to a remote server and receive from the server a verification result indicating whether the vehicle identification information is successfully verified.

In an example, the vehicle can be a container truck, and the loading/unloading machine can be a gantry crane, a forklift or a crane. The loading/unloading control apparatus 14 controlling the loading/unloading machine to load/unload goods may include: the loading/unloading control apparatus 14 controlling the loading/unloading machine to load a container corresponding to the vehicle identification information onto the vehicle; or the loading/unloading control apparatus 14 controlling the loading/unloading machine to unload a container from the vehicle. In an example, a goods transportation list, which specifies a correspondence between vehicle identification information of vehicles and goods transportation information, can be pre-stored in the loading/unloading control apparatus 14. Here, the goods transportation information can include a container number, a container position and the loading/unloading position. When the vehicle is to load goods, the loading/unloading control apparatus 14 can obtain the container number, container position and loading/unloading position corresponding to the vehicle identification information from the goods transportation list, and transmit to the loading/unloading machine a loading instruction containing the container number, container position and loading/unloading position, such that the loading/unloading robot can move to the container position and load the container corresponding to the container number onto the vehicle stopping at the loading/unloading position. When the vehicle is to unload goods, the loading/unloading control apparatus 14 can obtain the container number, container position and loading/unloading position corresponding to the vehicle identification information from the goods transportation list, and transmit to the loading/unloading machine an unloading instruction containing the container number, container position and loading/unloading position, such that the loading/unloading robot can unload the container from the vehicle at the loading/unloading position and place it at the container position.

In another example, the loading/unloading machine can be a robot or a forklift. The vehicle can be a van having a compartment door that can be electrically controlled to open or close and a lifting platform provided at a lower end of the compartment door. The loading/unloading position can be in front of a warehouse door of a target warehouse. The warehouse door can have a warehouse platform. The vehicle controller 12 can be further configured to control the compartment door to open autonomously after controlling the vehicle to stop at the loading/unloading position, and to control the lifting platform to fall to the warehouse platform; and, upon receiving the loading/unloading completion indication, to control the compartment door to autonomously close and control the lifting platform to retract. Accordingly, the loading/unloading control apparatus 14 can be further configured to control the warehouse door to autonomously open when the vehicle identification information is successfully verified, and to control the warehouse door to close when the loading/unloading by the loading/unloading machine has completed.

In another example, magnetic nails or magnetic bars are laid on respective floors of the warehouse platform, the lifting platform and the compartment. The loading/unloading control apparatus 14 controlling the loading/unloading machine to load/unload goods may include: the loading/unloading control apparatus 14 controlling the loading/unloading machine to continuously sensing magnetic signals generated from the magnetic nails or magnetic bars laid on the respective floors of the warehouse platform, the lifting platform and the compartment using its magnetic navigation sensor, so as to navigate and trace in accordance with a predetermined fixed path for loading/unloading.

In another example, a goods transportation list, which specifies a correspondence between vehicle identification information of vehicles and goods transportation information, can be pre-stored in the loading/unloading control apparatus 14. Here, the goods transportation information can include a goods number, a goods position and the loading/unloading position. When the vehicle is to load goods, the loading/unloading control apparatus 14 can obtain the goods number, goods position and loading/unloading position corresponding to the vehicle identification information from the goods transportation list, and transmit to the loading/unloading machine a loading instruction containing the goods number, goods position and loading/unloading position, such that the loading/unloading robot can move to the goods position and load the goods corresponding to the goods number onto the vehicle stopping at the loading/unloading position. When the vehicle is to unload goods, the loading/unloading control apparatus 14 can obtain the goods number, goods position and loading/unloading position corresponding to the vehicle identification information from the goods transportation list, and transmit to the loading/unloading machine an unloading instruction containing the goods number, goods position and loading/unloading position, such that the loading/unloading robot can unload the goods from the vehicle at the loading/unloading position and place them at the goods position.

In an embodiment of the present disclosure, the compartment door may have any of various structures corresponding to different schemes for the compartment door to autonomously open. Structures 1~4 will be described below as examples and the present disclosure is not limited to any of the following four structures of the compartment door.

Figure 8:
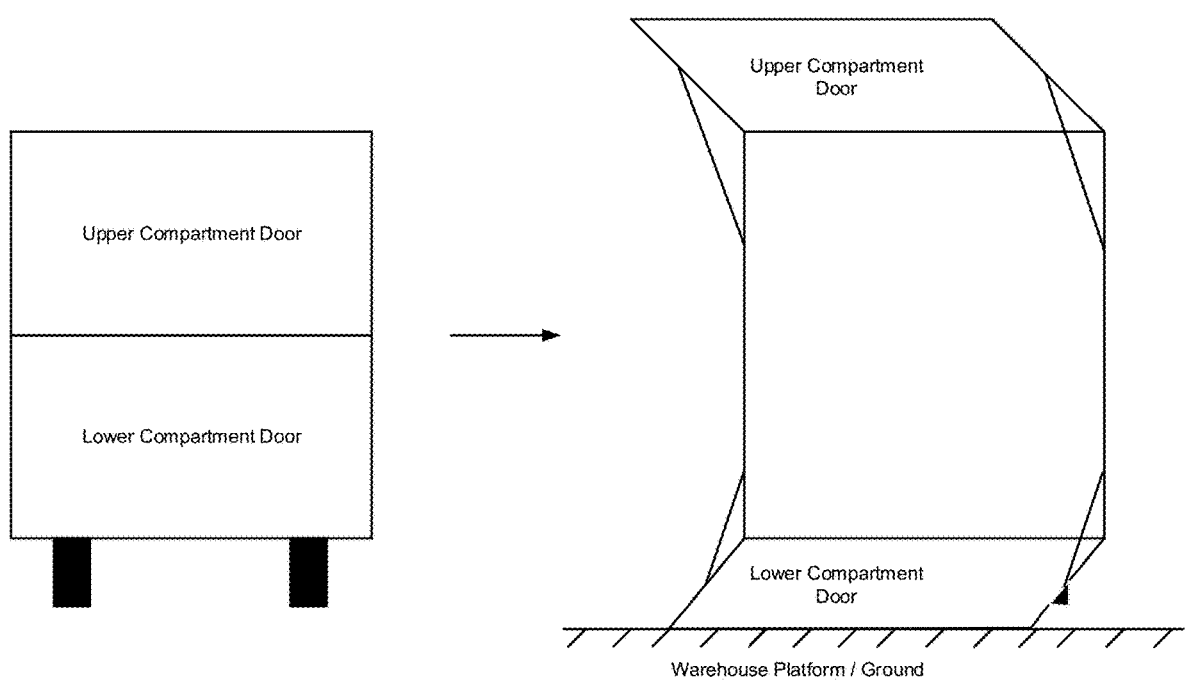
FIG. 8 is a first schematic diagram showing a structure of a compartment door of a vehicle according to an embodiment of the present disclosure.

Structure 1: As shown in FIG. 8, the compartment door may include an upper compartment door and a lower compartment door that can open vertically. The lower compartment door can be a lifting platform that can autonomously rise or fall. The vehicle controller controlling the compartment door to open autonomously may include: the vehicle controller controlling the upper compartment door to open upwards and the lower compartment door to open downwards and fall to the warehouse platform.

Figure 9:
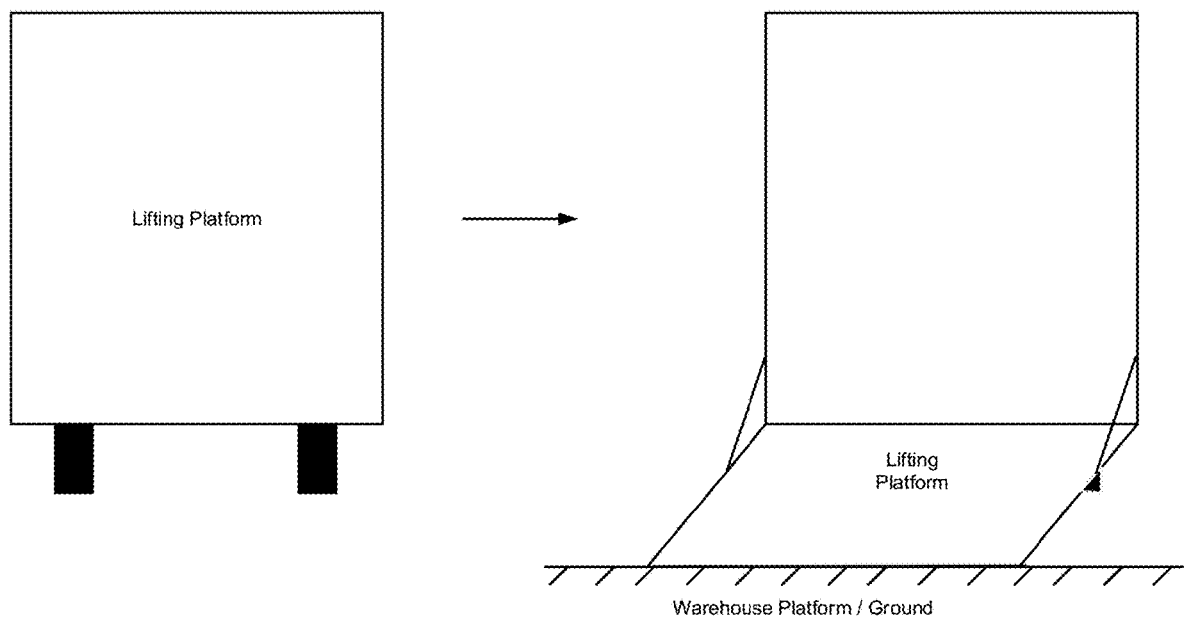
FIG. 9 is a second schematic diagram showing a structure of a compartment door of a vehicle according to an embodiment of the present disclosure.

Structure 2: As shown in FIG. 9, the compartment door may include a lifting platform that can autonomously rise or fall. When retracted, the lifting platform becomes the compartment door. The vehicle controller controlling the compartment door to open autonomously may include: the vehicle controller controlling the lifting platform to open downwards and fall to the warehouse platform.

Figure 10:
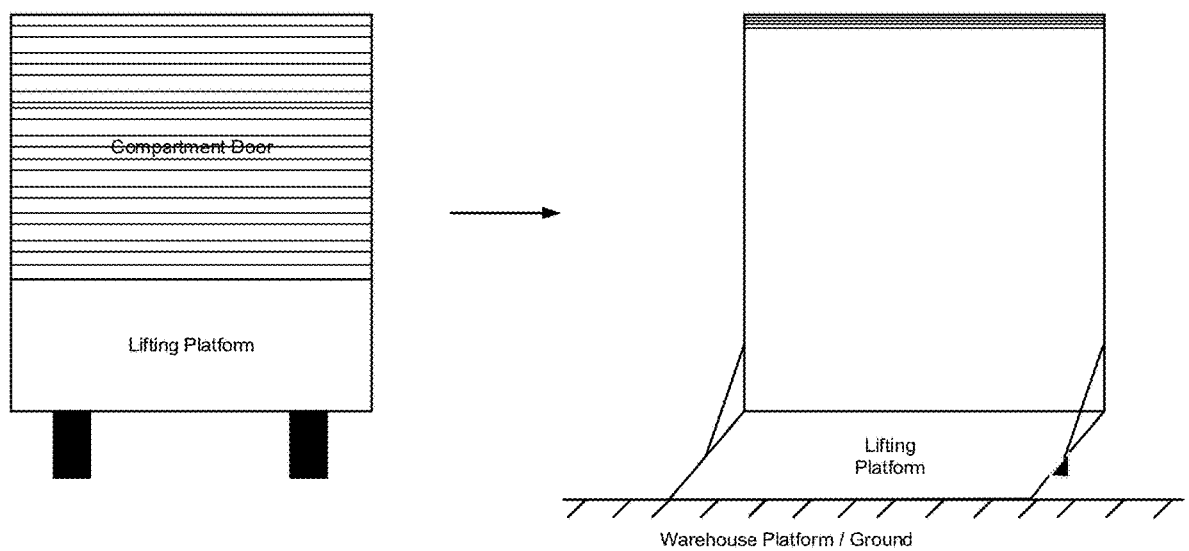
FIG. 10 is a third schematic diagram showing a structure of a compartment door of a vehicle according to an embodiment of the present disclosure.

Structure 3: As shown in FIG. 10, the compartment door may include a rolling compartment door and a lifting platform that can rise or fall. The vehicle controller controlling the compartment door to open autonomously may include: the vehicle controller controlling the lifting platform to open downwards and fall to the warehouse platform, and then controlling the rolling compartment door to roll up to the top.

Figure 11:
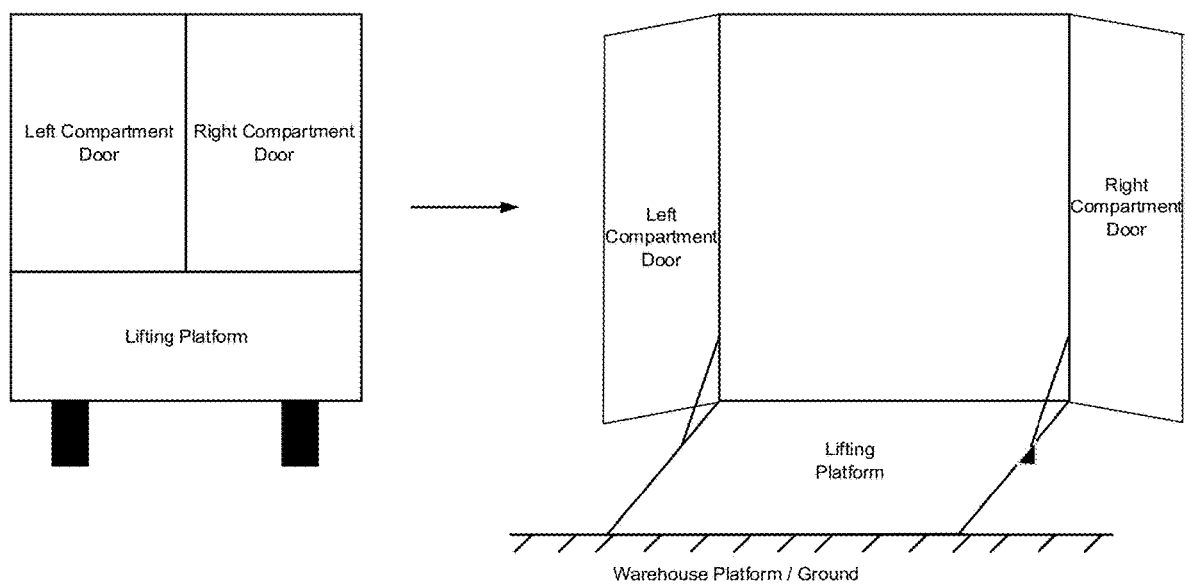
FIG. 11 is a fourth schematic diagram showing a structure of a compartment door of a vehicle according to an embodiment of the present disclosure.

Structure 4: As shown in FIG. 11, the compartment door may include a left compartment door and a right compartment door that can open horizontally, as well as a lifting platform that can rise or fall. The vehicle controller controlling the compartment door to open autonomously may include: the vehicle controller controlling the lifting platform to open downwards and fall to the warehouse platform, and then controlling the left and right compartment doors to open outwards.

Alternatively, the left and right compartment doors in the above Structure 4 can be electrical retractable doors that can retract leftwards and rightwards.

The structure of the compartment door may include a compartment door and a goods plate. The compartment door may include an upper compartment door and a lower compartment door that can open vertically, or a left compartment door and a right compartment door that can open horizontally. The goods plate may be pushed or pulled like a drawer along rails on the floor of the compartment or the chassis of the vehicle.

Preferably, as there is a blind area at the back of the vehicle, in order to accurately control the vehicle to move to the loading/unloading position, according to an embodiment of the present disclosure, the loading/unloading control apparatus 14 may include a roadside base station, which can be installed near the loading/unloading position (e.g., next to a road, on a streetlight, on a warehouse door, or on a gantry crane).

Preferably, in an embodiment of the present disclosure, the vehicle controller 12 can control the vehicle to autonomously move to the loading/unloading position by using any of the following schemes (Schemes J1~J2), as non-limiting examples.

In Scheme J1, the vehicle controller 12 can receive environment information and a location of the roadside base station from the roadside base station, and receive a location of the vehicle from a vehicle-mounted sensor (e.g., a positioning sensor, such as a GPS, an Inertial Measurement Unit (IMU), or the like) in the vehicle. The vehicle controller 12 can control the vehicle to move and stop at the loading/unloading position in a predetermined gesture based on the location of the vehicle, the location of the roadside base station and the environment information.

In Scheme J2, the vehicle controller 12 can control a vehicle-mounted sensor to transmit a location of the vehicle to the roadside base station, and control the vehicle to move and stop at the loading/unloading position in a predetermined gesture in accordance with moving guidance information (e.g., turning left by  degrees, turning right by  degrees, back off ** meters, or the like) transmitted from the roadside base station. The moving guidance information can be a driving control instruction generated by the roadside base station based on the location of the vehicle and the location of the roadside base station.

In Scheme J2, the roadside base station can obtain a kinematical model of the vehicle from the vehicle controller 12, and calculate an optimal trace for the vehicle from a current position to a specified position based on the kinematical model, the current position and a current gesture of the vehicle. The roadside base station can calculate a steering angle and a speed of the vehicle based on the optimal trace, current gesture, current position and kinematical model of the vehicle, and transmit the steering angle and the speed to the vehicle controller, such that the vehicle controller 12 can control the vehicle to move and stop at the loading/unloading position in accordance with the steering angle and the speed.

In Schemes J1 and J2, the predetermined gesture may depend on a position of the compartment door of the vehicle. When the compartment door is provided at the back of the vehicle, the predetermined gesture may be the back of the vehicle facing the warehouse door. When the compartment door is provided on a side of the vehicle, the predetermined gesture may be the side of the vehicle facing the warehouse door.

Embodiment 3

Figure 12:
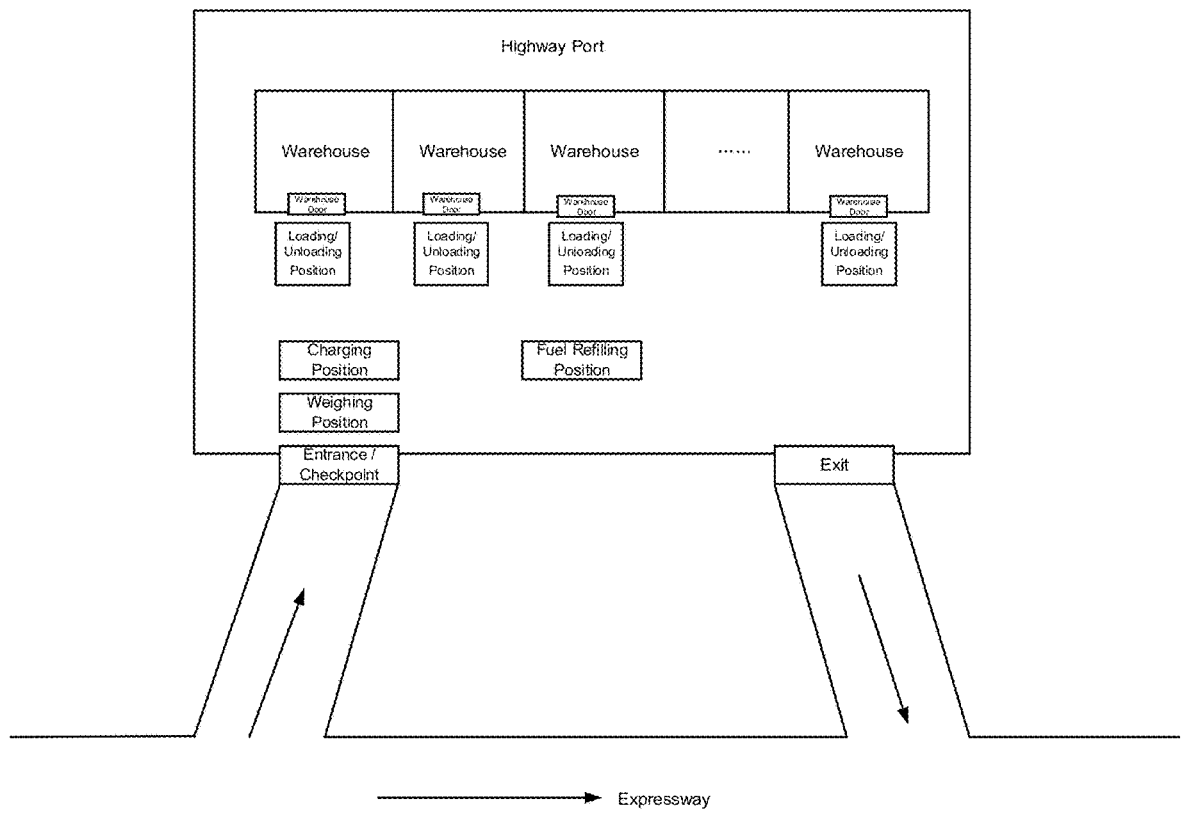
FIG. 12 is a sixth schematic diagram showing a structure of a highway port according to an embodiment of the present disclosure.
Figure 13:
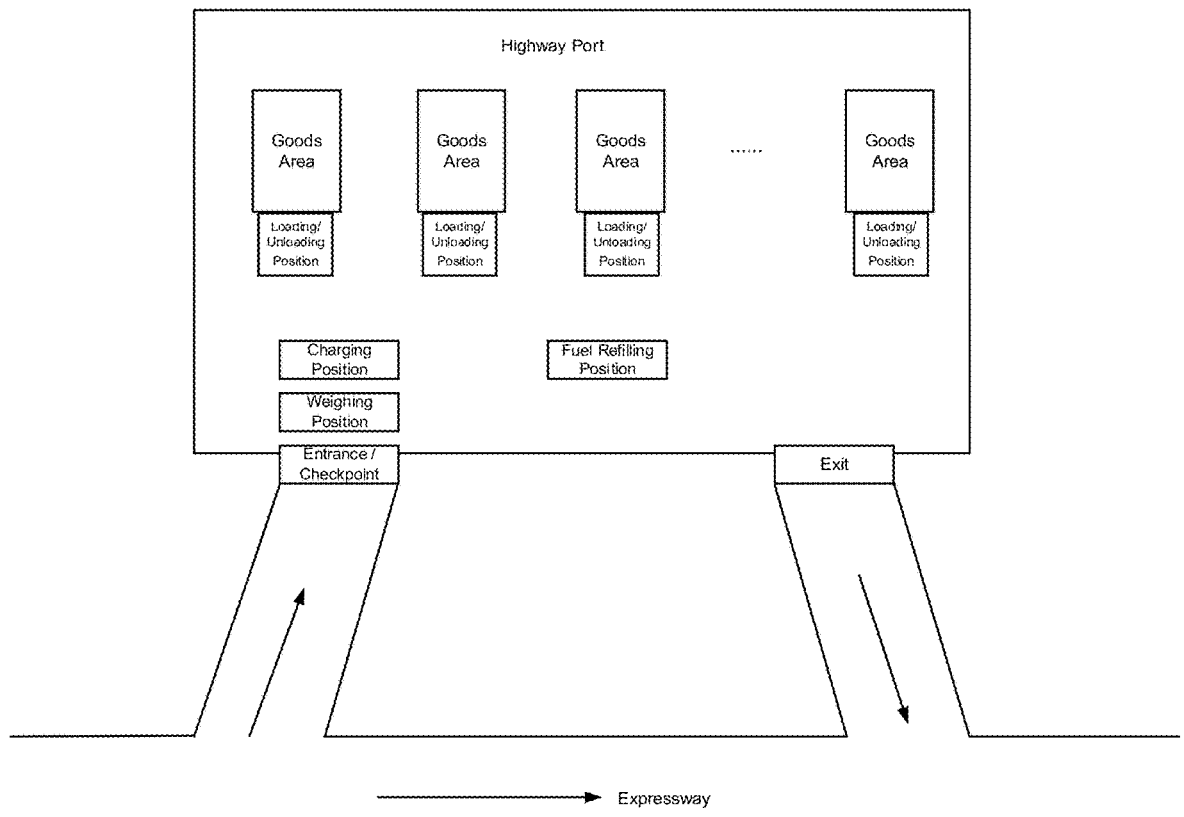
FIG. 13 is a seventh schematic diagram showing a structure of a highway port according to an embodiment of the present disclosure.

The highway port in Embodiment 3 differs from the highway ports in Embodiment 1 and Embodiment 2 in that a fuel refilling position is added. A fuel refilling terminal 17 can be provided at the fuel refilling position. The vehicle controller 12 can control the vehicle to stop at the fuel refilling position, and interact with the fuel refilling terminal 17 for autonomous fuel refilling. FIG. 12 shows a highway port in which a fuel refilling position is added to the highway port shown in FIG. 6. FIG. 13 shows a highway port in which a fuel refilling position is added to the highway port shown in FIG. 7.

The amount of fuel to be refilled is highly dependent on the load on the vehicle. Thus, it is required to weigh the vehicle before refilling the fuel to the vehicle. The vehicle controller 12 can be further configured to: control the vehicle to autonomously move from the loading/unloading position to a weighing position after the autonomous loading/unloading has completed, and interact with a ground scale sensor corresponding to the weighing position for autonomous weighing; and control the vehicle to autonomously move from the weighing position to a fuel refilling position, and interact with a fuel refilling terminal 17 corresponding to the fuel refilling position for autonomous fuel refilling.

In an embodiment of the present disclosure, one or more weighing positions can be provided in the highway port. For example, one weighing position and one charging position can be provided the entrance position, and one weighing position and one charging position can be provided the exit position.

The vehicle controller 12 can interact with the fuel refilling terminal 17 corresponding to the fuel refilling position for autonomous fuel refilling as follows. The vehicle controller 12 can transmit a refilling instruction carrying a fuel amount to the fuel refilling terminal 17, and control the vehicle to start and leave the fuel refilling position in response to receiving a fuel refilling completion indication transmitted from the fuel refilling terminal 17. The fuel refilling terminal 17 can refill the fuel amount of fuel to a fuel tank of the vehicle autonomously in accordance with the refilling instruction, and transmit the fuel refilling completion indication to the vehicle controller 12 in response to determining that the vehicle controller 12 has paid a fuel fee.

In an example, the vehicle controller 12 can be further configured to calculate the fuel amount to be refilled based on a weight of the vehicle and a fuel refilling policy in the transportation plan. The fuel amount is carried in the refilling instruction.

In an example, the fuel refilling terminal 17 can be further configured to obtain vehicle identification information of the vehicle, obtain a weight and a fuel refilling policy corresponding to the vehicle identification information, and calculate the fuel amount to be refilled based on the weight and the fuel refilling policy in the transportation plan.

In an example, the fuel refilling policy may indicate fuel amounts different weight levels of vehicles consume per 100 kilometers (referred to as fuel amounts per 100 kilometers). In this case, the vehicle controller 12 or the fuel refilling terminal 17 can calculate the fuel amount to be refilled by obtaining the fuel amount per 100 kilometers corresponding to the weight level to which the weight of the vehicle belongs, determining the total required fuel amount based on the fuel amount per 100 kilometers and the mileage to be covered according to the transportation plan for the vehicle (i.e., the distance between a start point and an end point), obtaining a remaining fuel amount in the fuel tank of the vehicle, and determining a difference between the total required fuel amount and the remaining fuel amount as the fuel amount to be refilled. Alternatively, the total required fuel amount can be determined as the fuel amount to be refilled directly.

In an example, the fuel refilling policy may indicate an equation for calculating the fuel amount to be refilled. In this case, the vehicle controller 12 or the fuel refilling terminal 17 can calculate the fuel amount to be refilled by obtaining values of parameters in the equation (such as the weight of the vehicle, the covered mileage and any one or more of a ground friction coefficient, a wind resistance, and an amount of fuel consumed by other parts of the vehicle per 100 kilometers), and calculating the fuel amount to be refilled based on the values of the respective parameters.

In an example, the fuel refilling terminal 17 can be further configured to calculate the fuel fee corresponding to the fuel amount, transmit the fuel fee to the vehicle controller 12, and determine that the vehicle controller has paid the fuel fee in response to successfully receiving the fuel fee paid by the vehicle controller. Accordingly, the vehicle controller 12 can be further configured to autonomously pay the fuel fee in response to receiving the fuel fee.

The vehicle controller 12 autonomously paying the fuel fee in response to receiving the fuel fee may include: the vehicle controller 12 swiping a fuel rechargeable card on a card swiping position of the fuel refilling terminal, or the vehicle controller 12 controlling a vehicle-mounted camera to scan a QR code corresponding to the fuel refilling terminal and paying the fuel fee using third-party payment software.

In another example, the fuel refilling terminal 17 can be further configured to calculate the fuel fee corresponding to the fuel amount, bill an account corresponding to the vehicle identification information for the fuel fee, or deduct the fuel fee from an ETC or a fuel rechargeable card corresponding to the vehicle identification information. The fuel refilling terminal 17 can determine that the vehicle controller 12 has paid the fuel fee in response to successfully billing the account for the fuel fee or successfully deducting the fuel fee from the ETC or the fuel rechargeable card.

In an embodiment, the vehicle controller 12 can interact with the fuel refilling terminal 17 corresponding to the fuel refilling position for autonomous fuel refilling by using any of the following schemes (Schemes K1~K4), as non-limiting examples.

In Scheme K1, the vehicle controller 12 can calculate a fuel amount to be refilled based on a weight of the vehicle and a fuel refilling policy in the transportation plan, transmit a refilling instruction carrying the fuel amount to the fuel refilling terminal, autonomously pay a fuel fee in response to receiving the fuel fee, and control the vehicle to start and leave the fuel refilling position in response to receiving a fuel refilling completion indication transmitted from the fuel refilling terminal 17. Accordingly, the fuel refilling terminal 17 can refill the fuel amount of fuel to a fuel tank of the vehicle autonomously in accordance with the refilling instruction, transmit the fuel fee to the vehicle controller 12, receive the fuel fee paid by the vehicle controller 12, and transmit the fuel refilling completion indication to the vehicle controller 12.

In Scheme K2, the vehicle controller 12 can transmit a refilling instruction carrying a weight of the vehicle to the fuel refilling terminal 17, autonomously pay a fuel fee in response to receiving the fuel fee, and control the vehicle to start and leave the fuel refilling position in response to receiving a fuel refilling completion indication transmitted from the fuel refilling terminal 17. Accordingly, the fuel refilling terminal 17 can calculate a fuel amount to be refilled based on the weight of the vehicle in the refilling instruction and a predetermined fuel refilling policy, refill the fuel amount of fuel to a fuel tank of the vehicle autonomously, transmit the fuel fee to the vehicle controller 12, receive the fuel fee paid by the vehicle controller 12, and transmit the fuel refilling completion indication to the vehicle controller 12.

In Schemes K1 and K2, the vehicle controller 12 can autonomously pay the fuel fee in response to receiving the fuel fee and the fuel refilling terminal 17 can receive the fuel fee by using any of the following schemes (Schemes L1~L2), as non-limiting examples.

In Scheme L1, upon receiving the fuel fee, the vehicle controller 12 can swipe a fuel rechargeable card on a card swiping position of the fuel refilling terminal 17. The fuel refilling terminal 17 can read and deduct the fuel fee from the fuel rechargeable card.

In an embodiment of the present disclosure, a mechanical arm can be provided at a cab of the vehicle. The mechanical arm can take the fuel rechargeable card from a position where it is stored and swipe it at the card swiping position of the fuel refilling terminal.

In Scheme L2, upon receiving the fuel fee, the vehicle controller 12 can control a vehicle-mounted camera to scan a QR code corresponding to the fuel refilling terminal 17 and pay the fuel fee using third-party payment software. The fuel refilling terminal 17 can receive the fuel fee using the third-party payment software.

In Scheme K3, the vehicle controller 12 can calculate a fuel amount to be refilled based on a weight of the vehicle and a fuel refilling policy in the transportation plan, transmit a refilling instruction carrying the fuel amount to the fuel refilling terminal, and control the vehicle to start and leave the fuel refilling position in response to receiving a fuel refilling completion indication transmitted from the fuel refilling terminal 17. Accordingly, the fuel refilling terminal 17 can refill the fuel amount of fuel to a fuel tank of the vehicle autonomously in accordance with the refilling instruction, bill an account corresponding to the vehicle identification information for the fuel fee or deduct the fuel fee from an ETC or a fuel rechargeable card corresponding to the vehicle identification information, and transmit the fuel refilling completion indication to the vehicle controller 12.

In Scheme K4, the vehicle controller 12 can transmit a refilling instruction carrying a weight of the vehicle to the fuel refilling terminal 17, and control the vehicle to start and leave the fuel refilling position in response to receiving a fuel refilling completion indication transmitted from the fuel refilling terminal 17. Accordingly, the fuel refilling terminal 17 can calculate a fuel amount to be refilled based on the weight of the vehicle in the refilling instruction and a predetermined fuel refilling policy, refill the fuel amount of fuel to a fuel tank of the vehicle autonomously, bill an account corresponding to the vehicle identification information for the fuel fee or deduct the fuel fee from an ETC or a fuel rechargeable card corresponding to the vehicle identification information, and transmit the fuel refilling completion indication to the vehicle controller 12.

In Schemes K3 and K4, a correspondence between vehicle identification information and bills or ETCs of respective vehicles can be pre-stored at the fuel refilling terminal 17. In the case of billing, the fuel refilling terminal 17 can pre-store a correspondence between the vehicle identification information and the payment scheme, and can transmit bills corresponding to the vehicle identification information to the corresponding payer periodically (e.g., per month, per season, per half year or per year) such that the payer can pay the corresponding fee.

In Schemes K3 and K4, the vehicle controller 12 can actively transmit the vehicle identification information to the fuel refilling terminal 17. Alternatively, the fuel refilling terminal 17 can recognize the vehicle identification information of the vehicle in the same way the checkpoint controller 13 recognizes the vehicle identification information, and details thereof will be omitted here.

In an embodiment of the present disclosure, the fuel may include the following types: combustible preparations (such as gasoline, diesel, ethanol, or the like), combustible gases (biogas, natural gas, or the like), or fuel cells, and the present disclosure is not limited thereto.

Embodiment 4

Figure 14:
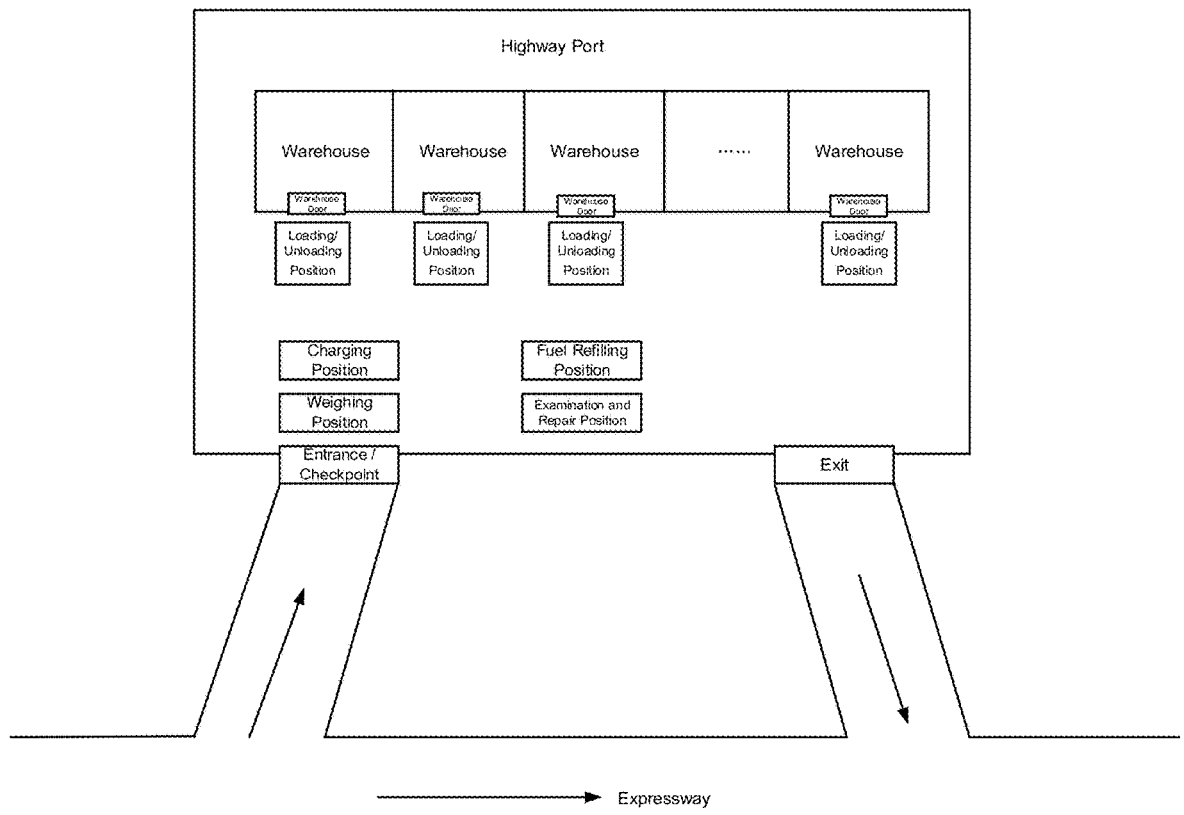
FIG. 14 is an eighth schematic diagram showing a structure of a highway port according to an embodiment of the present disclosure.
Figure 15:
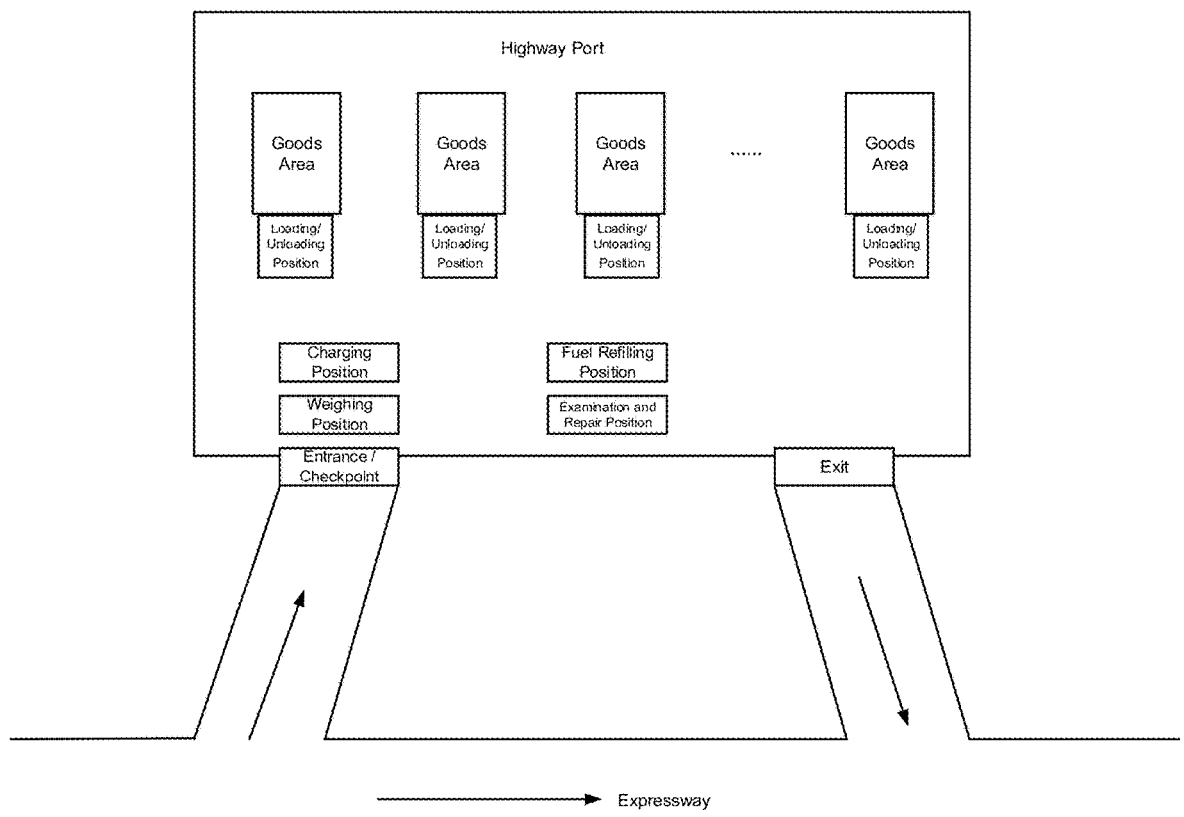
FIG. 15 is a ninth schematic diagram showing a structure of a highway port according to an embodiment of the present disclosure.

The highway port according to Embodiment 4 differs from the highway ports according to Embodiments 1, 2 and 3 in that an examination and repair position is added. An examination and repair apparatus 18 is provided at the examination and repair position. The vehicle controller 12 can control the vehicle to stop at the examination and repair position, and interact with the examination and repair apparatus 18 for autonomous examination and repair. For example, FIG. 14 shows a highway port in which an examination and repair position is added to the highway port shown in FIG. 12. FIG. 15 shows a highway port in which an examination and repair position is added to the highway port shown in FIG. 13.

The vehicle controller 12 can be further configured to: obtain self-checking data of the vehicle; control the vehicle to autonomously move and stop at an examination and repair position in response to determining that the vehicle malfunctions based on the self-checking data of the vehicle, and interact with an examination and repair apparatus corresponding to the examination and repair position for autonomous examination and repair.

In an embodiment of the present disclosure, the vehicle controller 12 can obtain the self-checking data of the vehicle by using any of the following schemes (Schemes M1~M2), as non-limiting examples.

In Scheme M1, the vehicle controller 12 can obtain monitoring data from a self-checking system of the vehicle.

In Scheme M1, the vehicle controller 12 can actively transmit a request for obtaining the monitoring data to the self-checking system of the vehicle periodically, so as to obtain the monitoring data from the self-checking system of the vehicle.

In Scheme M2, the vehicle controller 12 can receive monitoring data from a self-checking system of the vehicle.

In Scheme M2, the self-checking system of the vehicle can actively transmit the monitoring data to the vehicle controller periodically.

In an embodiment of the present disclosure, the monitoring data may contain self-checking data of various parts of the vehicle, including e.g., tire pressure abnormity alarm information, Transmission Control Unit (TCU) voltage abnormity alarm information, Anti-lock Braking System (ABS) abnormity alarm information, brake abnormity alarm information, airbag abnormity alarm information, or the like.

In an embodiment of the present disclosure, when the monitoring data contains alarm information for a part, it can be determined that the part malfunctions.

The vehicle controller 12 can interact with the examination and repair apparatus 18 corresponding to the examination and repair position for autonomous examination and repair as follows. The vehicle controller 12 can transmit vehicle diagnosis information to the examination and repair apparatus 18. The examination and repair apparatus 18 can determine a repair proposal based on the vehicle diagnosis information, and transmit the repair proposal to the vehicle controller 12.

In an embodiment of the present disclosure, the vehicle controller 12 can obtain the vehicle diagnosis information from an On-Board Diagnostic (OBD) system via a Controller Area Network (CAN) bus, and transmit the vehicle diagnosis information to the examination and repair apparatus 18.

In an embodiment of the present disclosure, the examination and repair apparatus 18 can determine the repair proposal based on the vehicle diagnosis information by using any of the following schemes (Schemes N1~N3), as non-limiting examples.

In Scheme N1, the examination and repair apparatus 18 can obtain the repair proposal corresponding to the vehicle diagnosis information from a pre-stored correspondence between vehicle diagnosis information and repair proposals.

In Scheme N2, the examination and repair apparatus 18 can transmit the vehicle diagnosis information to a remote server, and receive from the server the repair proposal corresponding to the vehicle diagnosis information.

In Scheme N3, the examination and repair apparatus 18 can display a request for proposal containing the vehicle diagnosis information on a repair interface, and generate the repair proposal corresponding to the vehicle diagnosis information based on contents a repairer inputs on the repair interface in response to the request for proposal.

In an embodiment of the present disclosure, the vehicle controller 12 controlling the vehicle to autonomously move and stop at the examination and repair position may include: the vehicle controller 12 planning a route from a current position to a selected examination and repair position by using map software or navigation software installed in the vehicle controller, and controlling the vehicle to move along the route and stop at the examination and repair position.

In an embodiment of the present disclosure, the selected examination and repair position can be an examination and repair position closest to the current position of the vehicle.

In an embodiment of the present disclosure, the vehicle controller 12 can actively transmit the vehicle identification information to the examination and repair apparatus 18.

Alternatively, the examination and repair apparatus 18 can actively recognize the vehicle identification information of the vehicle in the same way the checkpoint controller 13 recognizes the vehicle identification information, and details thereof will be omitted here.

In an embodiment of the present disclosure, the repair proposal may include, but not limited to, one or more of: no repair required, to be repaired within the highway port, to call for rescue, to have a minor repair in a maintenance store or a 4S store, to have a major repair in a maintenance store or a 4S store, or the like. When the repair proposal is to have a minor or major repair in a maintenance store or a 4S store, the vehicle controller 12 can search for a maintenance store or 4S store closest to the target highway port in an electronic map, and control the vehicle to move from the examination and repair position to an exit position of the target highway port and control the vehicle to move from the exit position to the closest maintenance store or 4S store.

The vehicle controller 12 can be further configured to control the vehicle to autonomously move from the loading/unloading position to an exit position of the target highway port and leave the target highway port after the autonomous loading/unloading has completed.

The vehicle controller 12 controlling the vehicle to autonomously move from the loading/unloading position to the exit position of the target highway port may include: controlling the vehicle to autonomously move from the loading/unloading position to a weighing position for autonomous weighing; controlling the vehicle to autonomously move from the weighing position to a charging position for autonomous charging; and controlling the vehicle to autonomously move from the charging position to the exit position.

For implementation of the autonomous weighing at the weighing position and the autonomous charging at the charging position, reference can be made to the above description, and details thereof will be omitted here.

Figure 16:
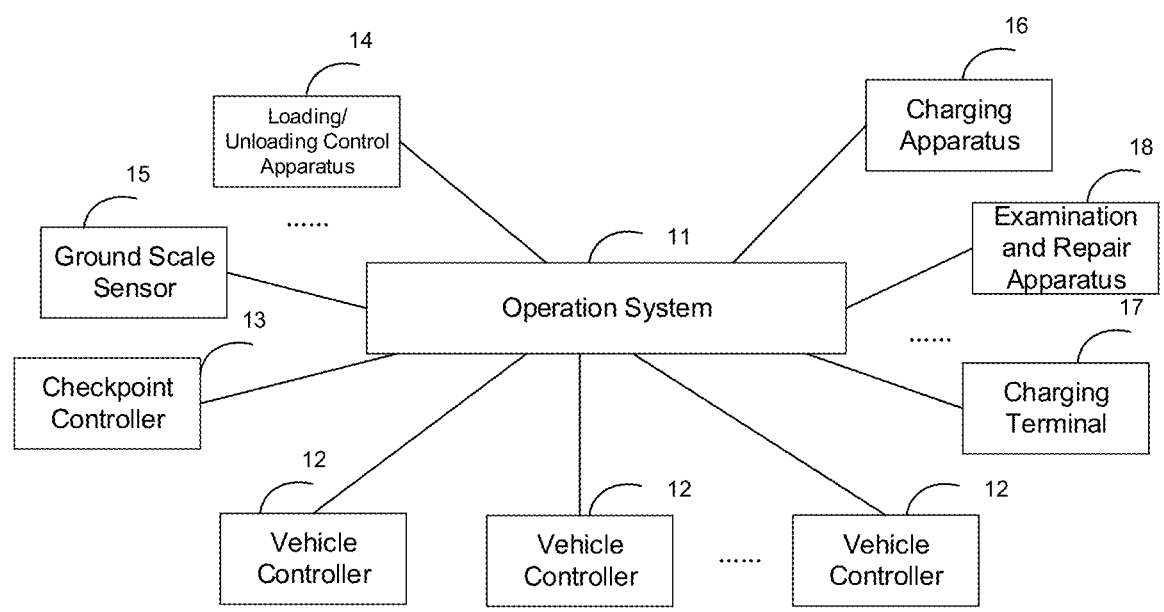
FIG. 16 is a second schematic diagram showing a structure of a system for autonomous vehicle transportation according to an embodiment of the present disclosure.

In an example, in the above Embodiments 1~4, the operation system 11 may manage all terminal devices within all highway ports directly, i.e., the operation system 11 may interact with all terminal devices within all highway ports directly, as shown in FIG. 16. In this case, the operation system 11 obtaining the transportation plan execution progress for the vehicle executing the transportation plan may include: receiving task execution information for the vehicle executing the transportation plan from the terminal device within the target highway port in the transportation plan, and generating the transportation plan execution progress for the vehicle based on the task execution information. Here, the transportation plan execution progress can be obtained by the control unit marking completed tasks and uncompleted tasks in the transportation task list based on the task execution information.

Figure 17:
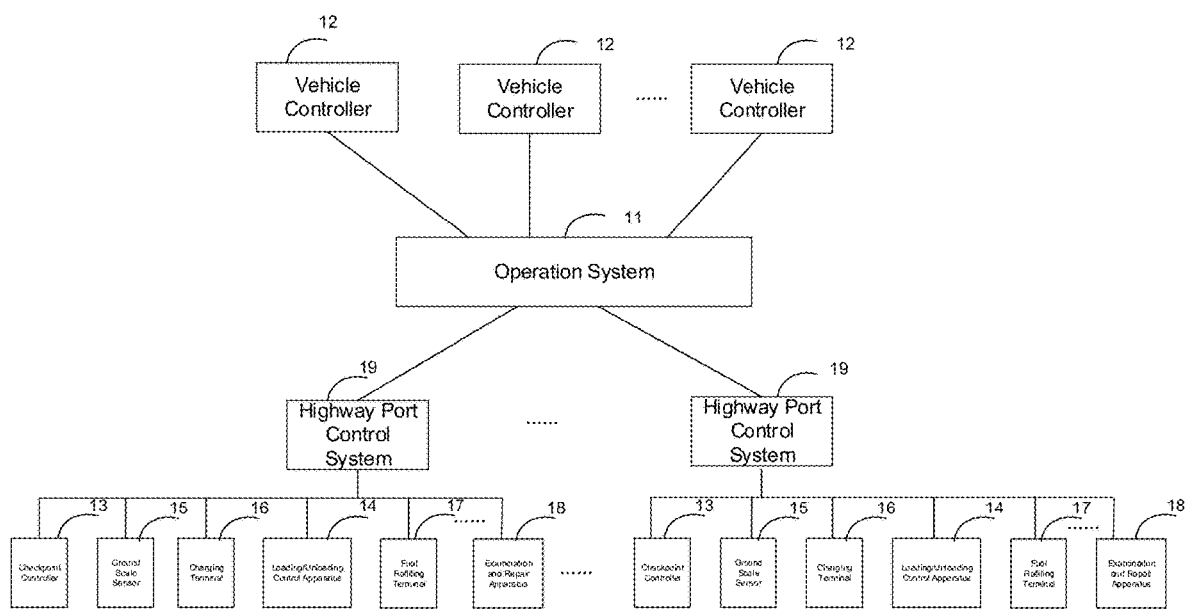
FIG. 17 is a third schematic diagram showing a structure of a system for autonomous vehicle transportation according to an embodiment of the present disclosure.

In another example, in the above Embodiments 1~4, a highway port control system 19 can be provided in advance for each highway port, or a highway port control system 19 can be provided in advance for all highway ports, as shown in FIG. 17. The highway port control system 19 can manage all terminal devices within one or more highway ports it manages. The operation system 11 can manage each highway port control system 19. In this case, the operation system 11 obtaining the transportation plan execution progress for the vehicle executing the transportation plan may include: generating a transportation task list based on the transportation plan for the vehicle, transmitting the transportation task list in association with vehicle identification information of the vehicle to the highway port control system 19 corresponding to the target highway port in the transportation plan, and receiving the transportation plan execution progress for the vehicle from the target highway port control system 19. Here, the transportation plan execution progress can be obtained by the highway port control system 19 marking completed tasks and uncompleted tasks in the transportation task list based on the task execution information transmitted from the terminal devices within the target highway port.

In an embodiment of the present disclosure, the terminal devices included within the highway port may include one or more of: a checkpoint controller, a ground scale sensor, a charging terminal, a loading/unloading control apparatus, a fuel refilling terminal and an examination and repair apparatus. The task execution information transmitted from the checkpoint controller may indicate whether the vehicle has passed the checkpoint. The task execution information transmitted from the ground scale sensor may indicate whether the vehicle has been weighed. The task execution information transmitted from the charging terminal may indicate whether the vehicle has paid the fee. The task execution information transmitted from the loading/unloading control apparatus may indicate whether the vehicle has loaded or unloaded goods. The task execution information transmitted from the fuel refilling terminal may include whether the vehicle has been refilled with fuel. The task execution information transmitted from the examination and repair apparatus may indicate whether the vehicle has been autonomously examined and repaired.

In an embodiment of the present disclosure, the transportation plan may include: vehicle identification information, transportation task information, and in-port task information. Here, the transportation task information may include a transportation start point, time of departure from the start point, a target highway port, loading/unloading instruction information, and time of arrival at the target highway port. The in-port task information may include task items and an execution order of the task items. Here, the task items may include any one or more of: passing the checkpoint at the position of the checkpoint, weighing at the weighing position, charging at the charging position, loading/unloading goods at the loading/unloading position, refilling at the fuel refilling position, examining and repairing at the examination and repair position, weighing at the weighing position after loading/unloading, and leaving the target highway port.

In an embodiment of the present disclosure, a goods transportation list can be stored in the operation system. The goods transportation list may include a number of goods transportation tasks each containing a type of goods, an amount of goods, a storage position of goods, a destination of goods transportation, time of departure for goods transportation, and time of arrival at the destination for goods transportation. The operation system can update the goods transportation list in real time or periodically depending on actual situations, e.g., by adding new goods transportation tasks, removing goods transportation tasks, modifying goods transportation tasks, or the like.

Basic information and dynamic information of various transportation vehicles can also be stored in the operation system. Here, the basic information may include vehicle identification information of the vehicle, a load capacity of the vehicle, a type of the vehicle (e.g., a container vehicle, a van, or a tanker), or a type of goods the vehicle is allowed to carry (e.g., fresh food, flammable objects, animals, or ordinary goods). The dynamic information may include vehicle state information (e.g., normal, malfunctioning, or under examination and repair), vehicle position information, or vehicle operation information (e.g., executing the transportation plan or in an idle state). The operation system can communicate with the vehicle controller of the vehicle, such that the operation system can obtain the dynamic information of the vehicle from the vehicle controller in real time or periodically. Alternatively, the vehicle controller can synchronize the dynamic information to the operation system periodically.

The operation system generating the transportation plan for the vehicle may include: the operation system determining a vehicle that matches each goods transportation task based on each goods transportation task and the basic information and dynamic information of each vehicle; and generating the transportation plan that matches the goods transportation task for the vehicle that matches the goods transportation task based on the goods transportation task.

For example, a goods transportation task may be to transport 10 tons of gasoline stored at Warehouse A, departing from Warehouse A on Jul. 1, 2017 and arriving at Highway Port B on July 3. The operation system may select from all vehicles a tanker that is normally operating, available from July 1 to July 3, and capable of carrying at least 10 tons of gasoline, as the vehicle that matches the goods transportation task (if more than one tanker is available, a vehicle near Warehouse A can be selected as the matching vehicle from these tankers). The operation system can generate a transportation plan for the matching vehicle based on the transportation task.

In an embodiment of the present disclosure, a guide road as shown in FIG. 4 can be provided in the highway port shown in each of FIGS. 2, 3, 7, 12, 13, 14, and 15. The rotatable base as shown in FIG. 5A or 5B can be provided at the position of the checkpoint in the highway port as shown in each of FIGS. 2, 3, 4, 7, 12, 13, 14, and 15. A weighing position and a charging position can be provided before the exit position in the highway port as shown in each of FIGS. 2, 3, 4, 5A, 5B, 7, 12, 13, 14, and 15. Before leaving the highway port, the vehicle can be autonomously weighed at the weighing position and autonomously charged at the charging position, and can then leave the highway port via the exit (details thereof will be omitted here).

The weighing position, charging position, examination and repair position, and fuel refilling position in the highway port as shown in the figures according to the embodiments of the present disclosure are illustrative only, and the present disclosure is not limited to these specific positions.

The system for autonomous transportation according to the embodiments of the present disclosure can be applied to docks, coastal ports (e.g., Yang-Shan Port), or the like, in addition to highway ports.

Embodiment 5

Figure 18:
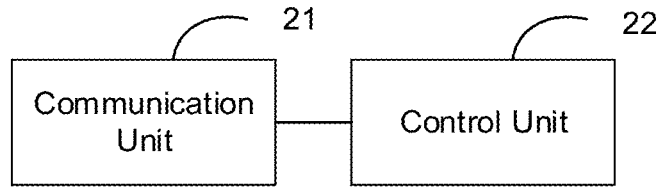
FIG. 18 is a schematic diagram showing a structure of a vehicle controller according to an embodiment of the present disclosure.

According to Embodiment 5 of the present disclosure, a vehicle controller is provided. The vehicle controller has a structure shown in FIG. 18 and includes:

a communication unit 21 configured to transmit and receive information; and a control unit 22 configured to control, in accordance with a transportation plan received by the communication unit 21, a vehicle to autonomously move to a position of a checkpoint at an entrance to a target highway port, and interact with a checkpoint controller corresponding to the position of the checkpoint for autonomously passing the checkpoint; and control the vehicle to autonomously move from the position of the checkpoint to a specified loading/unloading position in the target highway port, and interact with a loading/unloading control apparatus for autonomous loading/unloading at the loading/unloading position.

The communication unit 21 can receive the transportation plan from an operation system and transmit the transportation plan to the control unit 22.

Preferably, the control unit 22 being configured to interact with the checkpoint controller corresponding to the position of the checkpoint for autonomously passing the checkpoint may include the control unit 22 being configured to: control the vehicle to start and pass the position of the checkpoint upon determining that the checkpoint has given the clearance.

Preferably, the control unit 22 being configured to determine that the checkpoint has given the clearance may include the control unit 22 being configured to determine that the checkpoint has given the clearance in response to receiving an allow-to-pass instruction transmitted from the checkpoint controller via the communication unit 21; or detect whether the checkpoint has given the clearance using a vehicle-mounted sensor, and determine that the checkpoint has given the clearance in response to detecting such clearance.

Preferably, the control unit 22 being configured to detect whether the checkpoint has given the clearance using the vehicle-mounted sensor may include the control unit 22 being configured to: determine that the checkpoint has given the clearance in response to determining from an image or point cloud data transmitted from the vehicle-mounted sensor that the checkpoint is in a state of clearance.

In Embodiment 5 of the present disclosure, the control unit 22 can detect whether the checkpoint in the front is in the state of clearance based on information transmitted from a vehicle-mounted sensor (e.g., a camera, a laser radar, a millimeter wave radar, or the like). For example, when the checkpoint is a road block, it can determine that the clearance has been given upon detecting that the road block is lifted. When the checkpoint is an electrical retractable door or sliding door, it can determine that the clearance has been given upon detecting that the electrical retractable door or sliding door has moved to one side or two sides and there is no further block behind the door.

Preferably, the control unit 22 can be further configured to control the vehicle to start and leave the position of the checkpoint in response to receiving first instruction information indicating that the vehicle is not allowed to pass and instructing the vehicle to leave the position of the checkpoint via a guide road from the checkpoint controller via the communication unit 21.

Preferably, the control unit 22 can be further configured to control the vehicle to start and leave the position of the checkpoint in response to receiving second instruction information indicating that the vehicle is not allowed to pass from the checkpoint controller via the communication unit 21.

Preferably, the control unit 22 being configured to control the vehicle to autonomously move to the position of the checkpoint at the entrance to the target highway port may include the control unit 22 being configured to: plan a route from a current position to the position of the checkpoint and controlling the vehicle to autonomously move along the route; and control the vehicle to stop in response to determining from an image or point cloud data transmitted from a vehicle-mounted sensor that an obstacle in the front is a checkpoint and the distance from the vehicle to the checkpoint is smaller than or equal to a distance threshold.

The control unit 22 being configured to control the vehicle to autonomously move from the position of the checkpoint to the specified loading/unloading position in the target highway port may include the control unit 22 being configured to: control the vehicle to autonomously move from the position of the checkpoint to a weighing position, and interact with a ground scale sensor corresponding to the weighing position for autonomous weighing at the weighing position; control the vehicle to autonomously move from the weighing position to a charging position, and interact with a charging terminal corresponding to the charging position for autonomous charging at the charging position; and control the vehicle to autonomously move from the charging position to the loading/unloading position.

Preferably, the control unit 22 being configured to interact with the ground scale sensor corresponding to the weighing position for autonomous weighing at the weighing position may include the control unit 22 being configured to control the vehicle to start and leave the weighing position in response to receiving weighing completion information from the ground scale sensor via the communication unit 21.

Preferably, the control unit 22 can be further configured to transmit vehicle identification information to the ground scale sensor via the communication unit 21.

Preferably, the control unit 22 being configured to interact with the charging terminal corresponding to the charging position for autonomous charging at the charging position may include the control unit 22 being configured to control the vehicle to start and leave the charging position in response to receiving leaving instruction information from the charging terminal via the communication unit 21.

Preferably, the control unit 22 can be further configured to autonomously pay an amount to be charged in response to receiving the amount to be charged from the charging terminal via the communication unit 21.

Preferably, the control unit 22 being configured to autonomously pay the amount to be charged in response to receiving the amount to be charged may include the control unit 22 being configured to: pay the amount to be charged using third-party payment software, or control a vehicle-mounted camera to scan a QR code corresponding to the charging terminal and pay the amount to be charged using third-party payment software.

The control unit 22 being configured to interact with the loading/unloading control apparatus for autonomous loading/unloading at the loading/unloading position may include the control unit 22 being configured to: control the vehicle to leave the loading/unloading position in response to receiving a loading/unloading completion indication from the loading/unloading control apparatus via the communication unit 21.

In an example, the vehicle can be a van having a compartment door that can be electrically controlled to open or close and a lifting platform provided at a lower end of the compartment door. The loading/unloading position can be in front of a warehouse door of a target warehouse. The warehouse door can have a warehouse platform. The control unit 22 can be further configured to control the compartment door to open autonomously after controlling the vehicle to stop at the loading/unloading position, and to control the lifting platform to fall to the warehouse platform; and, upon receiving the loading/unloading completion indication, to control the compartment door to autonomously close and control the lifting platform to retract.

The predetermined gesture may depend on a position of the compartment door of the vehicle. When the compartment door is provided at the back of the vehicle, the predetermined gesture may be the back of the vehicle facing the warehouse door. When the compartment door is provided on a side of the vehicle, the predetermined gesture may be the side of the vehicle facing the warehouse door.

Preferably, as there is a blind area at the back of the vehicle, in order to accurately control the vehicle to move to the loading/unloading position, according to an embodiment of the present disclosure, the loading/unloading control apparatus may include a roadside base station, which can be installed near the loading/unloading position (e.g., next to a road, on a warehouse door, or on a gantry crane).

In an example, the control unit 22 being configured to control the vehicle to autonomously move and stop at the loading/unloading position may include the control unit 22 being configured to receive environment information and a location of the roadside base station from the roadside base station, receive a location of the vehicle from a vehicle-mounted sensor in the vehicle, and control the vehicle to move and stop at the loading/unloading position in a predetermined gesture based on the location of the vehicle, the location of the roadside base station and the environment information.

In an example, the control unit 22 being configured to control the vehicle to autonomously move and stop at the loading/unloading position may include the control unit 22 being configured to control a vehicle-mounted sensor to transmit a location of the vehicle to the roadside base station, and control the vehicle to move and stop at the loading/unloading position in a predetermined gesture in accordance with moving guidance information transmitted from the roadside base station. The moving guidance information can be a driving control instruction generated by the roadside base station based on the location of the vehicle and the location of the roadside base station.

In order to facilitate refilling fuel to the vehicle conveniently, a fuel refilling station can be provided in the highway port. As an amount of fuel to be refilled is highly dependent on the load on the vehicle, it is required to weigh the vehicle before refilling the fuel to the vehicle.

The control unit 22 can be further configured to: control the vehicle to autonomously move from the loading/unloading position to a weighing position after the autonomous loading/unloading has completed, and interact with a ground scale sensor corresponding to the weighing position for autonomous weighing; and control the vehicle to autonomously move from the weighing position to a fuel refilling position, and interact with a fuel refilling terminal corresponding to the fuel refilling position for autonomous fuel refilling.

The control unit 22 being configured to interact with the fuel refilling terminal corresponding to the fuel refilling position for autonomous fuel refilling may include the control unit 22 being configured to: transmit a refilling instruction carrying a fuel amount to the fuel refilling terminal via the communication unit 21, and control the vehicle to start and leave the fuel refilling position in response to receiving a fuel refilling completion indication transmitted from the fuel refilling terminal via the communication unit 21.

The control unit 22 can be further configured to calculate the fuel amount to be refilled based on a weight of the vehicle and a fuel refilling policy in the transportation plan. The fuel amount is carried in the refilling instruction.

The control unit 22 can be further configured to autonomously pay a fuel fee in response to receiving the fuel fee from the fuel refilling terminal via the communication unit 21.

The control unit 22 being configured to autonomously pay the fuel fee in response to receiving the fuel fee may include the control unit 22 being configured to: swipe a fuel rechargeable card on a card swiping position of the fuel refilling terminal, or control a vehicle-mounted camera to scan a QR code corresponding to the fuel refilling terminal and paying the fuel fee using third-party payment software.

Preferably, in order to further improve the driving security of the vehicle, the control unit 22 can be further configured to: obtain self-checking data of the vehicle; control the vehicle to autonomously move and stop at an examination and repair position in response to determining that the vehicle malfunctions based on the self-checking data of the vehicle, and interact with an examination and repair apparatus corresponding to the examination and repair position for autonomous examination and repair.

The control unit 22 being configured to interact with the examination and repair apparatus corresponding to the examination and repair position for autonomous examination and repair may include the control unit 22 being configured to: transmit vehicle diagnosis information to the examination and repair apparatus via the communication unit 21; and receive a corresponding repair proposal from the examination and repair apparatus via the communication unit 21.

In an embodiment of the present disclosure, the repair proposal may include, but not limited to, one or more of: no repair required, to be repaired within the highway port, to call for rescue, to have a minor repair in a maintenance store or a 4S store, to have a major repair in a maintenance store or a 4S store, or the like. When the repair proposal is to have a minor or major repair in a maintenance store or a 4S store, the control unit 22 can search for a maintenance store or 4S store closest to the target highway port in an electronic map, and control the vehicle to move from the examination and repair position to an exit position of the target highway port and control the vehicle to move from the exit position to the closest maintenance store or 4S store.

In Embodiment 5 of the present disclosure, the control unit 22 can actively transmit the vehicle identification information to the examination and repair apparatus via the communication unit 21. Alternatively, the examination and repair apparatus can actively recognize the vehicle identification information of the vehicle.

Preferably, the control unit 22 can be further configured to control the vehicle to autonomously move from the loading/unloading position to an exit position of the target highway port and leave the target highway port after the autonomous loading/unloading has completed.

Embodiment 6

Figure 19:
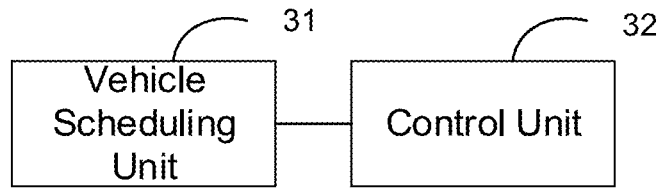
FIG. 19 is a schematic diagram showing a structure of an operation system according to an embodiment of the present disclosure.

According to Embodiment 6 of the present disclosure, an operation system is provided. The operation system has a structure shown in FIG. 19 and include:

a vehicle scheduling unit 31 configured to generate a transportation plan for a vehicle, transmit the transportation plan to a vehicle controller of the vehicle, and adjust the transportation plan for the vehicle based on a transportation plan execution progress for the vehicle; and a control unit 32 configured to obtain the transportation plan execution progress for the vehicle executing the transportation plan and transmit the transportation plan execution progress to the vehicle scheduling unit 31.

In an example, the operation system may manage all terminal devices within all highway ports directly, i.e., the control unit 32 may interact with all terminal devices within all highway ports directly. In this case, the control unit 32 obtaining the transportation plan execution progress for the vehicle executing the transportation plan may include: receiving task execution information for the vehicle executing the transportation plan from the terminal device within the target highway port in the transportation plan, and generating the transportation plan execution progress for the vehicle based on the task execution information. Here, the transportation plan execution progress can be obtained by the control unit 32 marking completed tasks and uncompleted tasks in the transportation task list based on the task execution information.

In another example, a highway port control system can be provided in advance for each highway port, or a highway port control system can be provided in advance for all highway ports. The highway port control system can manage all terminal devices within one or more highway ports it manages. The operation system can manage each highway port control system, i.e., the control unit 32 can interact with each highway port control system directly. In this case, the control unit 32 obtaining the transportation plan execution progress for the vehicle executing the transportation plan may include: generating a transportation task list based on the transportation plan for the vehicle, transmitting the transportation task list in association with vehicle identification information of the vehicle to the highway port control system corresponding to the target highway port in the transportation plan, and receiving the transportation plan execution progress for the vehicle from the target highway port control system. Here, the transportation plan execution progress can be obtained by the highway port control system marking completed tasks and uncompleted tasks in the transportation task list based on the task execution information transmitted from the terminal devices within the target highway port.

In an embodiment of the present disclosure, the terminal devices included within the highway port may include one or more of: a checkpoint controller, a ground scale sensor, a charging terminal, a loading/unloading control apparatus, a fuel refilling terminal and an examination and repair apparatus. The task execution information transmitted from the checkpoint controller may indicate whether the vehicle has passed the checkpoint. The task execution information transmitted from the ground scale sensor may indicate whether the vehicle has been weighed. The task execution information transmitted from the charging terminal may indicate whether the vehicle has paid the fee. The task execution information transmitted from the loading/unloading control apparatus may indicate whether the vehicle has loaded or unloaded goods. The task execution information transmitted from the fuel refilling terminal may include whether the vehicle has been refilled with fuel. The task execution information transmitted from the examination and repair apparatus may indicate whether the vehicle has been autonomously examined and repaired.

Embodiment 7

Figure 20:
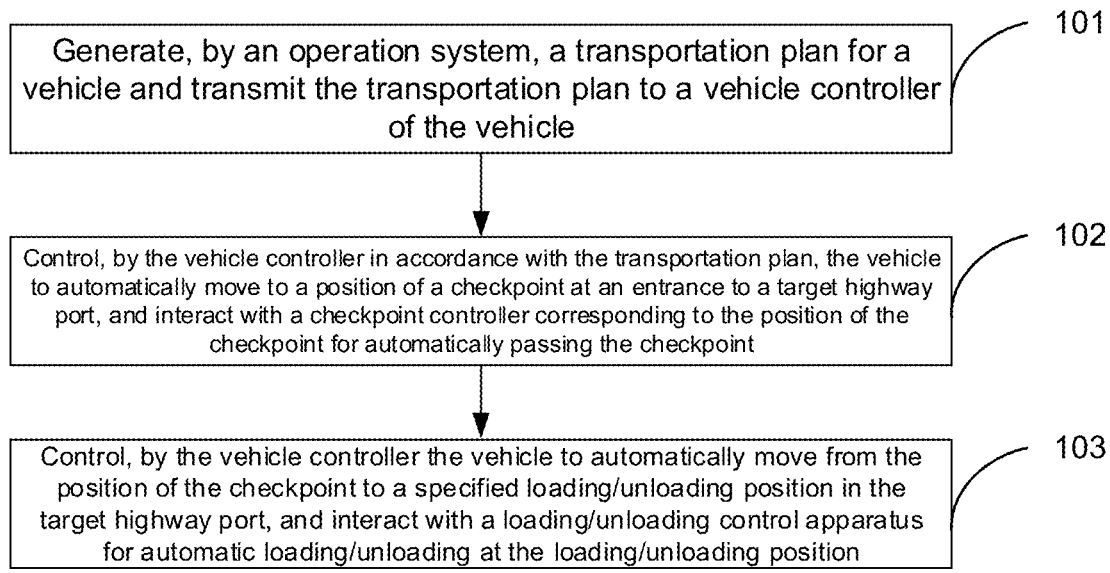
FIG. 20 is a first flowchart illustrating a method for autonomous vehicle transportation according to an embodiment of the present disclosure.

According to Embodiment 7 of the present disclosure, a method for autonomous vehicle transportation is provided. FIG. 20 shows a flowchart of this method, which includes the following steps.

At step 101, an operation system generates a transportation plan for a vehicle and transmits the transportation plan to a vehicle controller of the vehicle.

At step 102, the vehicle controller controls, in accordance with the transportation plan, the vehicle to autonomously move to a position of a checkpoint at an entrance to a target highway port, and interacts with a checkpoint controller corresponding to the position of the checkpoint for autonomously passing the checkpoint.

At step 103, the vehicle controller controls the vehicle to autonomously move from the position of the checkpoint to a specified loading/unloading position in the target highway port, and interacts with a loading/unloading control apparatus for autonomous loading/unloading at the loading/unloading position.

In an example, in the step 102, the operation of interacting with the checkpoint controller corresponding to the position of the checkpoint for autonomously passing the checkpoint may include the following steps A1~A2.

At step A1, the checkpoint controller obtains vehicle identification information of the vehicle, verifies the vehicle identification information, and controls the checkpoint to give a clearance to the vehicle when the vehicle identification information is successfully verified.

At step A2, the vehicle controller controls the vehicle to start and pass the position of the checkpoint upon determining that the checkpoint has given the clearance.

In the step A2, the vehicle controller determining that the checkpoint has given the clearance may include: the vehicle controller determining that the checkpoint has given the clearance in response to receiving an allow-to-pass instruction transmitted from the checkpoint controller; or the vehicle controller detecting whether the checkpoint has given the clearance using a vehicle-mounted sensor, and determining that the checkpoint has given the clearance in response to detecting such clearance.

Preferably, the vehicle controller detecting whether the checkpoint has given the clearance using the vehicle-mounted sensor may include: the vehicle controller determining that the checkpoint has given the clearance in response to determining from an image or point cloud data transmitted from the vehicle-mounted sensor that the checkpoint is in a state of clearance.

Preferably, the checkpoint controller can obtain the vehicle identification information of the vehicle by using any of the following schemes, as non-limiting examples. The checkpoint controller can actively recognize the vehicle identification information of the vehicle. Alternatively, the checkpoint controller can receive the vehicle identification information of the vehicle from the vehicle controller.

The checkpoint controller can actively recognize the vehicle identification information of the vehicle in the same way as described in Embodiment 1, and details thereof will be omitted here.

There may be vehicles accidentally entering the highway port in practice. Preferably, in an example, in order to guide such vehicles to leave the highway port better and faster, the above method may further include: the checkpoint controller transmitting to the vehicle controller first instruction information indicating that the vehicle is not allowed to pass and instructing the vehicle to leave the position of the checkpoint via a guide road, when the vehicle identification information is not successfully verified. The vehicle controller can control the vehicle to start and leave the position of the checkpoint in response to receiving the first instruction information.

Preferably, in an example, in order to allow a vehicle accidentally entering the highway port to leave the highway port more quickly, according to an embodiment of the present disclosure, the position of the checkpoint can be configured as a rotatable base. The checkpoint controller can control the rotatable base to rotate clockwise or counterclockwise to stop at two directions, one for entering the highway port (e.g., facing the checkpoint) and the other one for leaving the highway port (e.g., facing away from the checkpoint or facing the direction of the guide road). The above method may further include: the checkpoint controller transmitting to the vehicle controller second instruction information indicating that the vehicle is not allowed to pass, and rotating the rotatable base such that the vehicle is heading away from the position of the checkpoint, when the vehicle identification information is not successfully verified. The vehicle controller can control the vehicle to start and leave the position of the checkpoint in response to receiving the second instruction information.

Preferably, in an embodiment of the present disclosure, the vehicle controller controlling the vehicle to autonomously move to the position of the checkpoint at the entrance to the target highway port may include: the vehicle controller planning a route from a current position to the position of the checkpoint and controlling the vehicle to autonomously move along the route; and the vehicle controller controlling the vehicle to stop in response to determining from an image or point cloud data transmitted from a vehicle-mounted sensor that an obstacle in the front is a checkpoint and the distance from the vehicle to the checkpoint is smaller than or equal to a distance threshold.

The vehicle controller can plan the route from the current position to the position of the checkpoint by using map software or navigation software on the vehicle side. The distance threshold can be an empirical value, or can be calculated based on a moving speed and an inertia of the vehicle, i.e., the distance threshold can be a distance the vehicle covers from braking to stopping.

Figure 21:
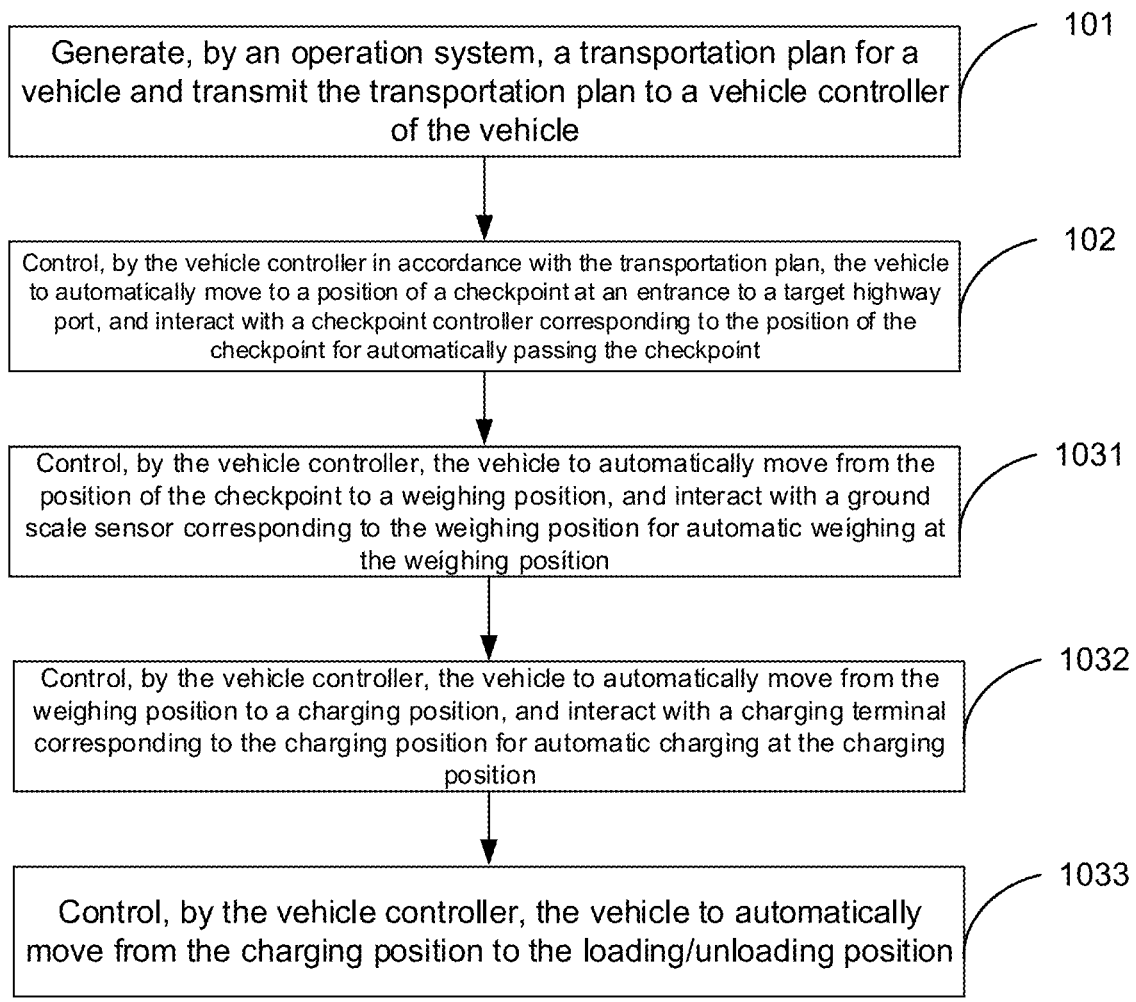
FIG. 21 is a second flowchart illustrating a method for autonomous vehicle transportation according to an embodiment of the present disclosure.

Preferably, in the step 103, the step of controlling the vehicle to autonomously move from the position of the checkpoint to the specified loading/unloading position in the target highway port may include steps 1031~1033, as shown in FIG. 21.

At step 1031, the vehicle controller controls the vehicle to autonomously move from the position of the checkpoint to a weighing position, and interacts with a ground scale sensor corresponding to the weighing position for autonomous weighing at the weighing position.

At step 1032, the vehicle controller controls the vehicle to autonomously move from the weighing position to a charging position, and interacting with a charging terminal corresponding to the charging position for autonomous charging at the charging position.

At step 1033, the vehicle controller controls the vehicle to autonomously move from the charging position to the loading/unloading position.

In an example, in the step 1031, the operation of interacting with the ground scale sensor corresponding to the weighing position for autonomous weighing at the weighing position may include the following steps B1~B2.

At step B1, the ground scale sensor can weigh the vehicle in response to sensing that the vehicle is stopping at the weighing position, and transmit weighing completion information to the vehicle controller.

At step B2, the vehicle controller can control the vehicle to start and leave the weighing position in response to receiving the weighing completion information.

Preferably, the vehicle controller can interact with the ground scale sensor corresponding to the weighing position for autonomous weighing at the weighing position as follows. The ground scale sensor can weigh the vehicle in response to sensing that the vehicle is stopping at the weighing position, and transmit weighing completion information to the vehicle controller. The vehicle controller can control the vehicle to start and leave the weighing position in response to receiving the weighing completion information.

Preferably, the above method can further include: the ground scale sensor obtaining vehicle identification information of the vehicle and transmitting a weighing result in association with the vehicle identification information to the charging terminal.

The ground scale sensor obtaining vehicle identification information of the vehicle may include: the ground scale sensor recognizing the vehicle identification information of the vehicle; or the ground scale sensor receiving the vehicle identification information from the vehicle controller.

The ground scale sensor can obtain the vehicle identification information of the vehicle in the same way as described above, and details thereof will be omitted here.

In an example, in the step 1032, the operation of interacting with the charging terminal corresponding to the charging position for autonomous charging may include the following steps C1~C4.

At step C1, the charging terminal obtains vehicle identification information of the vehicle.

At step C2, the charging terminal obtains a weighing result and a covered mileage corresponding to the vehicle identification information, and calculates an amount to be charged based on the weighing result and the covered mileage.

At step C3, the charging terminal transmits leaving instruction information to the vehicle controller after determining that the vehicle controller has paid the amount to be charged.

At step C4, the vehicle controller controls the vehicle to start and leave the charging position in response to receiving the leaving instruction information.

In an example, the method can further include: the charging terminal transmitting the amount to be charged to the vehicle controller; and the vehicle controller autonomously paying the amount to be charged in response to receiving the amount to be charged. The charging terminal determining that the vehicle controller has paid the amount to be charged may include: the charging terminal determining that the vehicle controller has paid the amount to be charged in response to successfully receiving the amount paid by the vehicle controller. The vehicle controller autonomously paying the amount to be charged in response to receiving the amount to be charged may include: the vehicle controller paying the amount to be charged using third-party payment software, or the vehicle controller controlling a vehicle-mounted camera to scan a QR code corresponding to the charging terminal and paying the amount to be charged using third-party payment software.

In another example, the method can further include: the charging terminal billing an account corresponding to the vehicle identification information for the amount to be charged, or deduct the amount to be charged from an ETC corresponding to the vehicle identification information. The charging terminal determining that the vehicle controller has paid the amount to be charged may include: the charging terminal determining that the vehicle controller has paid the amount to be charged in response to successfully billing the account for the amount to be charged or successfully deducting the amount to be charged from the ETC.

In an embodiment of the present disclosure, the charging terminal can calculate the amount to be charged based on the weighing result and the covered mileage as follows. A road rate schedule, which specifies fees to be charged for various types of vehicles having different weights on respective roads per kilometer, can be pre-stored in the charging terminal 16. The charging terminal 16 can calculate the fee to be charged for the vehicle per kilometer based on the obtained weighing result, the type of the vehicle and the road used, and then obtain the amount to be charged as a product of the fee to be charged per kilometer and the covered mileage (in units of kilometers).

The charging terminal can obtain the vehicle identification information of the vehicle in the same way as described above, and details thereof will be omitted here.

Preferably, in the step 1033, the operation of interacting with the loading/unloading control apparatus at the loading/unloading position for autonomous loading/unloading may include the following steps D1~D2.

At step D1, the loading/unloading control apparatus obtains vehicle identification information of the vehicle, verifies the vehicle identification information, controls a loading/unloading machine to load/unload goods when the vehicle identification information is successfully verified, and transmits a loading/unloading completion indication to the vehicle controller when the loading/unloading has completed.

At step D2, the vehicle controller controls the vehicle to leave the loading/unloading position upon receiving the loading/unloading completion indication.

The loading/unloading control apparatus can obtain the vehicle identification information of the vehicle in the same way as described above, and details thereof will be omitted here.

In an embodiment of the present disclosure, the loading/unloading control apparatus can verify the vehicle identification information as follows. A list of vehicle identification information can be pre-stored in the loading/unloading control apparatus. The loading/unloading control apparatus can match the vehicle identification information with the list of vehicle identification information and determine that the vehicle identification information is successfully verified when the vehicle identification information successfully matches the list of vehicle identification information; or otherwise determine that the vehicle identification information is not successfully verified. Alternatively, the loading/unloading control apparatus can transmit the vehicle identification information to a remote server and receive from the server a verification result indicating whether the vehicle identification information is successfully verified.

In an example, the vehicle can be a container truck, and the loading/unloading machine can be a gantry crane, a forklift or a crane. The loading/unloading control apparatus controlling the loading/unloading machine to load/unload goods may include: the loading/unloading control apparatus controlling the loading/unloading machine to load a container corresponding to the vehicle identification information onto the vehicle; or the loading/unloading control apparatus controlling the loading/unloading machine to unload a container from the vehicle. In an example, a goods transportation list, which specifies a correspondence between vehicle identification information of vehicles and goods transportation information, can be pre-stored in the loading/unloading control apparatus. Here, the goods transportation information can include a container number, a container position and the loading/unloading position. When the vehicle is to load goods, the loading/unloading control apparatus can obtain the container number, container position and loading/unloading position corresponding to the vehicle identification information from the goods transportation list, and transmit to the loading/unloading machine a loading instruction containing the container number, container position and loading/unloading position, such that the loading/unloading robot can move to the container position and load the container corresponding to the container number onto the vehicle stopping at the loading/unloading position. When the vehicle is to unload goods, the loading/unloading control apparatus can obtain the container number, container position and loading/unloading position corresponding to the vehicle identification information from the goods transportation list, and transmit to the loading/unloading machine an unloading instruction containing the container number, container position and loading/unloading position, such that the loading/unloading robot can unload the container from the vehicle at the loading/unloading position and place it at the container position.

In another example, the loading/unloading machine can be a robot or a forklift. The vehicle can be a van having a compartment door that can be electrically controlled to open or close and a lifting platform provided at a lower end of the compartment door. The loading/unloading position can be in front of a warehouse door of a target warehouse. The warehouse door can have a warehouse platform. The vehicle controller can be further configured to control the compartment door to open autonomously after controlling the vehicle to stop at the loading/unloading position, and to control the lifting platform to fall to the warehouse platform;

and, upon receiving the loading/unloading completion indication, to control the compartment door to autonomously close and control the lifting platform to retract. Accordingly, the loading/unloading control apparatus can be further configured to control the warehouse door to autonomously open when the vehicle identification information is successfully verified, and to control the warehouse door to close when the loading/unloading by the loading/unloading machine has completed.

In another example, magnetic nails or magnetic bars are laid on respective floors of the warehouse platform, the lifting platform and the compartment. The loading/unloading control apparatus controlling the loading/unloading machine to load/unload goods may include: the loading/unloading control apparatus controlling the loading/unloading machine to continuously sensing magnetic signals generated from the magnetic nails or magnetic bars laid on the respective floors of the warehouse platform, the lifting platform and the compartment using its magnetic navigation sensor, so as to navigate and trace in accordance with a predetermined fixed path for loading/unloading.

In another example, a goods transportation list, which specifies a correspondence between vehicle identification information of vehicles and goods transportation information, can be pre-stored in the loading/unloading control apparatus. Here, the goods transportation information can include a goods number, a goods position and the loading/unloading position. When the vehicle is to load goods, the loading/unloading control apparatus can obtain the goods number, goods position and loading/unloading position corresponding to the vehicle identification information from the goods transportation list, and transmit to the loading/unloading machine a loading instruction containing the goods number, goods position and loading/unloading position, such that the loading/unloading robot can move to the goods position and load the goods corresponding to the goods number onto the vehicle stopping at the loading/unloading position. When the vehicle is to unload goods, the loading/unloading control apparatus can obtain the goods number, goods position and loading/unloading position corresponding to the vehicle identification information from the goods transportation list, and transmit to the loading/unloading machine an unloading instruction containing the goods number, goods position and loading/unloading position, such that the loading/unloading robot can unload the goods from the vehicle at the loading/unloading position and place them at the goods position.

Preferably, as there is a blind area at the back of the vehicle, in order to accurately control the vehicle to move to the loading/unloading position, according to an embodiment of the present disclosure, the loading/unloading control apparatus may include a roadside base station, which can be installed near the loading/unloading position (e.g., next to a road, on a streetlight, on a warehouse door, or on a gantry crane).

In an example, in the step 103, the vehicle controller controlling the vehicle to autonomously move to the loading/unloading position may include the following steps E1~E2.

At step E1, the vehicle controller receives environment information and a location of the roadside base station from the roadside base station, and receives a location of the vehicle from a vehicle-mounted sensor in the vehicle.

At step E2, the vehicle controller controls the vehicle to move and stop at the loading/unloading position in a predetermined gesture based on the location of the vehicle, the location of the roadside base station and the environment information.

In an example, in the step 103, the vehicle controller controlling the vehicle to autonomously move to the loading/unloading position may include: the vehicle controller controlling a vehicle-mounted sensor to transmit a location of the vehicle to the roadside base station, and controlling the vehicle to move and stop at the loading/unloading position in a predetermined gesture in accordance with moving guidance information transmitted from the roadside base station. The moving guidance information can be a driving control instruction generated by the roadside base station based on the location of the vehicle and the location of the roadside base station.

The roadside base station can obtain a kinematical model of the vehicle from the vehicle controller, and calculate an optimal trace for the vehicle from a current position to a specified position based on the kinematical model, the current position and a current gesture of the vehicle. The roadside base station can calculate a steering angle and a speed of the vehicle based on the optimal trace, current gesture, current position and kinematical model of the vehicle, and transmit the steering angle and the speed to the vehicle controller, such that the vehicle controller can control the vehicle to move and stop at the loading/unloading position in accordance with the steering angle and the speed.

The predetermined gesture may depend on a position of the compartment door of the vehicle. When the compartment door is provided at the back of the vehicle, the predetermined gesture may be the back of the vehicle facing the warehouse door. When the compartment door is provided on a side of the vehicle, the predetermined gesture may be the side of the vehicle facing the warehouse door.

Figure 22:
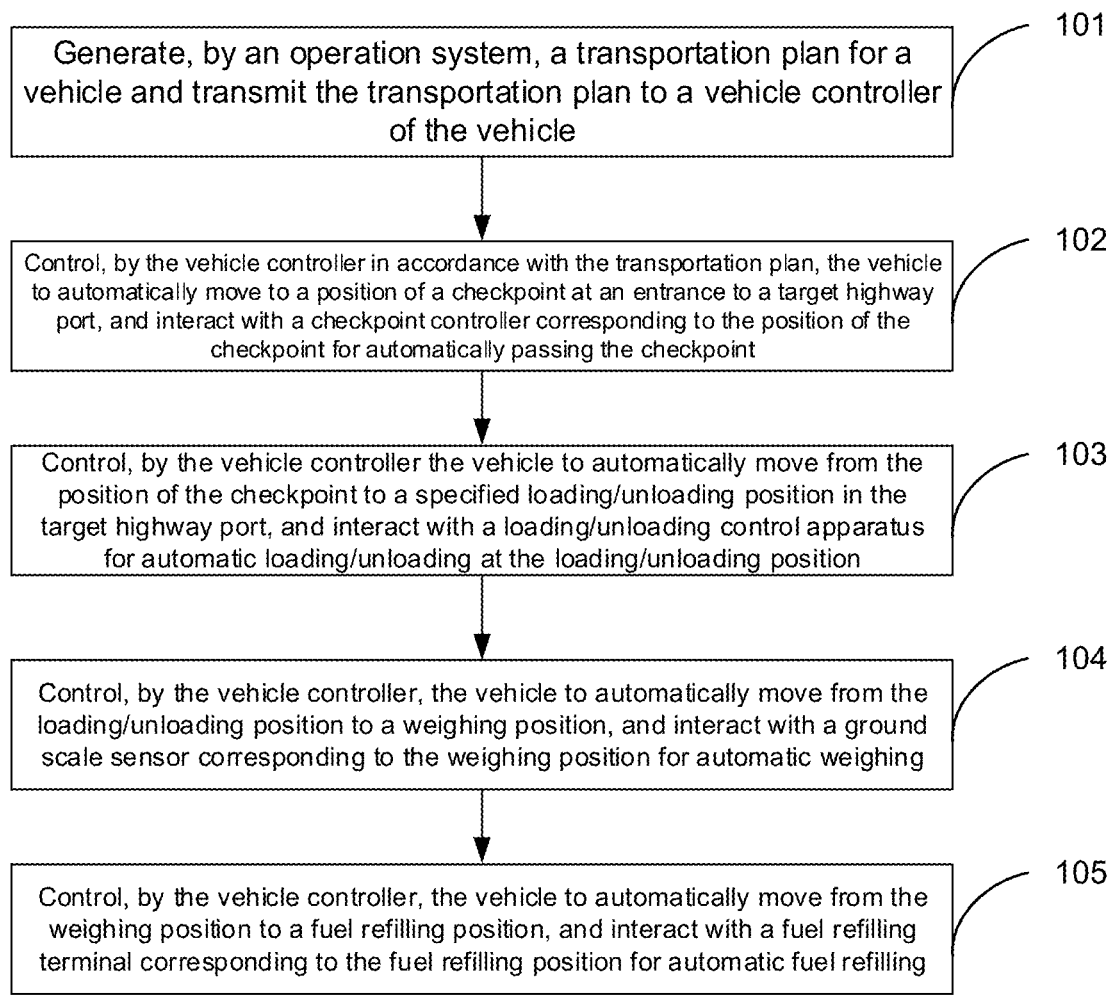
FIG. 22 is a third flowchart illustrating a method for autonomous vehicle transportation according to an embodiment of the present disclosure.
Figure 23:
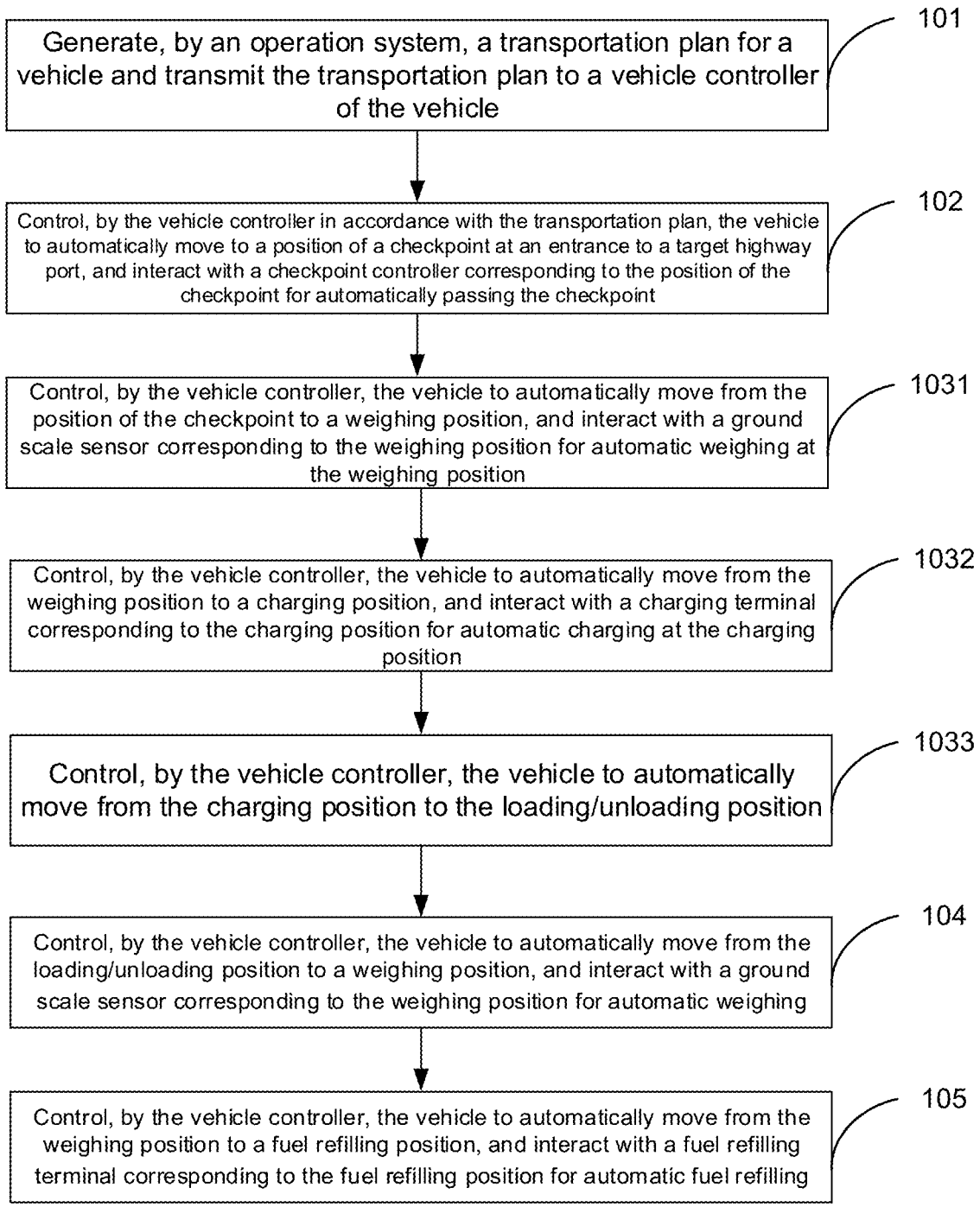
FIG. 23 is a fourth flowchart illustrating a method for autonomous vehicle transportation according to an embodiment of the present disclosure.

Preferably, the above process flows shown in FIGS. 20 and 21 can further include the following steps 104~105. FIG. 22 shows the method process shown in FIG. 20 further including the steps 104~105. FIG. 23 shows the method process shown in FIG. 21 further including the steps 104~105.

At step 104, the vehicle controller controls the vehicle to autonomously move from the loading/unloading position to a weighing position, and interact with a ground scale sensor corresponding to the weighing position for autonomous weighing.

At step 105, the vehicle controller controls the vehicle to autonomously move from the weighing position to a fuel refilling position, and interacts with a fuel refilling terminal corresponding to the fuel refilling position for autonomous fuel refilling.

In an example, in the step 105, the operation of interacting with the fuel refilling terminal corresponding to the fuel refilling position for autonomous fuel refilling may include: the vehicle controller transmitting a refilling instruction carrying a fuel amount to the fuel refilling terminal, and controlling the vehicle to start and leave the fuel refilling position in response to receiving a fuel refilling completion indication transmitted from the fuel refilling terminal; and the fuel refilling terminal refilling the fuel amount of fuel to a fuel tank of the vehicle autonomously in accordance with the refilling instruction, and transmitting the fuel refilling completion indication to the vehicle controller in response to determining that the vehicle controller has paid a fuel fee.

In an example, the step 105 can further include: calculating the fuel amount to be refilled based on a weight of the vehicle and a fuel refilling policy in the transportation plan. The fuel amount is carried in the refilling instruction.

In an example, the fuel refilling terminal can be further configured to obtain vehicle identification information of the vehicle, obtain a weight and a fuel refilling policy corresponding to the vehicle identification information, and calculate the fuel amount to be refilled based on the weight and the fuel refilling policy in the transportation plan.

In an example, the step 105 can further include: the fuel refilling terminal calculating the fuel fee corresponding to the fuel amount, and transmitting the fuel fee to the vehicle controller; the vehicle controller autonomously paying the fuel fee in response to receiving the fuel fee; and the fuel refilling terminal determining that the vehicle controller has paid the fuel fee in response to successfully receiving the fuel fee paid by the vehicle controller.

The vehicle controller autonomously paying the fuel fee in response to receiving the fuel fee may include: the vehicle controller swiping a fuel rechargeable card on a card swiping position of the fuel refilling terminal, or the vehicle controller controlling a vehicle-mounted camera to scan a QR code corresponding to the fuel refilling terminal and paying the fuel fee using third-party payment software.

In an example, the step 105 can further include: the fuel refilling terminal calculating the fuel fee corresponding to the fuel amount, billing an account corresponding to the vehicle identification information for the fuel fee, or deducting the fuel fee from an ETC or a fuel rechargeable card corresponding to the vehicle identification information; and the fuel refilling terminal determining that the vehicle controller has paid the fuel fee in response to successfully billing the account for the fuel fee or successfully deducting the fuel fee from the ETC or the fuel rechargeable card.

In an embodiment of the present disclosure, the fuel may include the following types: combustible preparations (such as gasoline, diesel, ethanol, or the like), combustible gases (biogas, natural gas, or the like), or fuel cells, and the present disclosure is not limited thereto.

Preferably, the above process flows shown in FIGS. 20~23 can further include the following step 106. FIG. 24 shows the method process shown in FIG. 23 further including the step 106.

At step 106, the vehicle controller obtains self-checking data of the vehicle; and controls the vehicle to autonomously move and stop at an examination and repair position in response to determining that the vehicle malfunctions based on the self-checking data of the vehicle, and interacts with an examination and repair apparatus corresponding to the examination and repair position for autonomous examination and repair.

In an embodiment of the present disclosure, the vehicle controller can obtain the self-checking data of the vehicle by using any of the following schemes, as non-limiting examples. The vehicle controller can obtain monitoring data from a self-checking system of the vehicle. Alternatively, the vehicle controller can receive monitoring data from a self-checking system of the vehicle.

In an embodiment of the present disclosure, the monitoring data may contain self-checking data of various parts of the vehicle, including e.g., tire pressure abnormity alarm information, TCU voltage abnormity alarm information, ABS abnormity alarm information, brake abnormity alarm information, or the like.

In an embodiment of the present disclosure, when the monitoring data contains alarm information for a part, it can be determined that the part malfunctions.

The vehicle controller interacting with the examination and repair apparatus corresponding to the examination and repair position for autonomous examination and repair may include: the vehicle controller transmitting vehicle diagnosis information to the examination and repair apparatus; and the examination and repair apparatus determining a repair proposal based on the vehicle diagnosis information, and transmitting the repair proposal to the vehicle controller.

In an embodiment of the present disclosure, the vehicle controller can obtain the vehicle diagnosis information from an OBD system via a CAN bus, and transmit the vehicle diagnosis information to the examination and repair apparatus.

In an embodiment of the present disclosure, the examination and repair apparatus can determine the repair proposal based on the vehicle diagnosis information by using any of the following schemes, as non-limiting examples. The examination and repair apparatus can obtain the repair proposal corresponding to the vehicle diagnosis information from a pre-stored correspondence between vehicle diagnosis information and repair proposals. Alternatively, the examination and repair apparatus can transmit the vehicle diagnosis information to a remote server, and receive from the server the repair proposal corresponding to the vehicle diagnosis information. Alternatively, the examination and repair apparatus can display a request for proposal containing the vehicle diagnosis information on a repair interface, and generate the repair proposal corresponding to the vehicle diagnosis information based on contents a repairer inputs on the repair interface in response to the request for proposal.

In an embodiment of the present disclosure, the vehicle controller controlling the vehicle to autonomously move and stop at the examination and repair position may include: the vehicle controller planning a route from a current position to a selected examination and repair position by using map software or navigation software installed in the vehicle controller, and controlling the vehicle to move along the route and stop at the examination and repair position.

In an embodiment of the present disclosure, the selected examination and repair position can be an examination and repair position closest to the current position of the vehicle.

In an embodiment of the present disclosure, the vehicle controller can actively transmit the vehicle identification information to the examination and repair apparatus. Alternatively, the examination and repair apparatus can actively recognize the vehicle identification information of the vehicle in the same way the checkpoint controller recognizes the vehicle identification information, and details thereof will be omitted here.

In an embodiment of the present disclosure, the repair proposal may include, but not limited to, one or more of: no repair required, to be repaired within the highway port, to call for rescue, to have a minor repair in a maintenance store or a 4S store, to have a major repair in a maintenance store or a 4S store, or the like. When the repair proposal is to have a minor or major repair in a maintenance store or a 4S store, the vehicle controller 12 can search for a maintenance store or 4S store closest to the target highway port in an electronic map, and control the vehicle to move from the examination and repair position to an exit position of the target highway port and control the vehicle to move from the exit position to the closest maintenance store or 4S store.

Preferably, the above method may further include: the vehicle controller controlling the vehicle to autonomously move from the loading/unloading position to an exit position of the target highway port and leave the target highway port after the autonomous loading/unloading has completed.

In an example, the vehicle controller controlling the vehicle to autonomously move from the loading/unloading position to the exit position of the target highway port may include: the vehicle controller planning a route from the loading/unloading position to the exit position, and controlling the vehicle to autonomously move from the loading/unloading position to the exit position along the route.

In another example, the vehicle controller controlling the vehicle to autonomously move from the loading/unloading position to the exit position of the target highway port may include: controlling the vehicle to autonomously move from the loading/unloading position to a weighing position for autonomous weighing; controlling the vehicle to autonomously move from the weighing position to a charging position for autonomous charging; and controlling the vehicle to autonomously move from the charging position to the exit position.

In an example, the operation system may manage all terminal devices within all highway ports directly, i.e., the operation system may interact with all terminal devices within all highway ports directly. In this case, the operation system obtaining the transportation plan execution progress for the vehicle executing the transportation plan may include: receiving task execution information for the vehicle executing the transportation plan from the terminal device within the target highway port in the transportation plan, and generating the transportation plan execution progress for the vehicle based on the task execution information. Here, the transportation plan execution progress can be obtained by the control unit marking completed tasks and uncompleted tasks in the transportation task list based on the task execution information.

A highway port control system can be provided in advance for each highway port, or a highway port control system can be provided in advance for all highway ports. The highway port control system can manage all terminal devices within one or more highway ports it manages. The operation system can manage each highway port control system. In this case, the operation system obtaining the transportation plan execution progress for the vehicle executing the transportation plan may include: generating a transportation task list based on the transportation plan for the vehicle, transmitting the transportation task list in association with vehicle identification information of the vehicle to the highway port control system 19 corresponding to the target highway port in the transportation plan, and receiving the transportation plan execution progress for the vehicle from the target highway port control system. Here, the transportation plan execution progress can be obtained by the highway port control system marking completed tasks and uncompleted tasks in the transportation task list based on the task execution information transmitted from the terminal devices within the target highway port.

In an embodiment of the present disclosure, the terminal devices included within the highway port may include one or more of: a checkpoint controller, a ground scale sensor, a charging terminal, a loading/unloading control apparatus, a fuel refilling terminal and an examination and repair apparatus. The task execution information transmitted from the checkpoint controller may indicate whether the vehicle has passed the checkpoint. The task execution information transmitted from the ground scale sensor may indicate whether the vehicle has been weighed. The task execution information transmitted from the charging terminal may indicate whether the vehicle has paid the fee. The task execution information transmitted from the loading/unloading control apparatus may indicate whether the vehicle has loaded or unloaded goods. The task execution information transmitted from the fuel refilling terminal may include whether the vehicle has been refilled with fuel. The task execution information transmitted from the examination and repair apparatus may indicate whether the vehicle has been autonomously examined and repaired.

With the system and method for autonomous vehicle transportation, in one aspect, the operation system can manage and schedule vehicles, generate transportation plans for the respective vehicles, and synchronize the transportation plans to vehicle controllers of the respective vehicles, such that no management personnel are needed for managing and scheduling the vehicles. In another aspect, the vehicle controller controls the vehicle to execute the transportation plan so as to achieve autonomous transportation of goods, without the need for truck drivers. In yet another aspect, with the vehicle controller controlling movement of the vehicle, problems such as driving while tired, drunk or drugged can be avoided, thereby improving the driving security. Therefore, the solutions according to the present disclosure can not only save costs of goods transportation, but also reduce security risks in driving vehicles.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programming skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A system, comprising:
 a vehicle scheduling unit configured to:
  generate a transportation plan for a vehicle;
  transmit the transportation plan to a vehicle controller of the vehicle configured to control, in accordance with the transportation plan, the vehicle to autonomously move to a position of a checkpoint at an entrance to a target highway port and from the position of the checkpoint to a specified loading/unloading position in the target highway port; and
  adjust the transportation plan for the vehicle based on a transportation plan execution progress for the vehicle; and
 a control unit configured to obtain the transportation plan execution progress for the vehicle executing the transportation plan and transmit the transportation plan execution progress to the vehicle scheduling unit.

2. The system of claim 1, wherein the obtaining the transportation plan execution progress for the vehicle executing the transportation plan comprises:
 receiving task execution information for the vehicle executing the transportation plan from a terminal device within the target highway port in the transportation plan; and
 generating the transportation plan execution progress for the vehicle based on the task execution information.

3. The system of claim 2, wherein the control unit is further configured to mark completed tasks and uncompleted tasks in a transportation task list based on the task execution information.

4. The system of claim 1, wherein the obtaining the transportation plan execution progress for the vehicle executing the transportation plan comprises:
 generating a transportation task list based on the transportation plan for the vehicle;
 transmitting the transportation task list in association with vehicle identification information of the vehicle to a highway port control system corresponding to the target highway port in the transportation plan; and
 receiving the transportation plan execution progress for the vehicle from the target highway port control system.

5. The system of claim 4, wherein the highway port control system is configured to mark completed tasks and uncompleted tasks in the transportation task list based on task execution information transmitted from terminal devices within the target highway port.

6. The system of claim 5, wherein the terminal devices included within the highway port include at least one of: a checkpoint controller, a ground scale sensor, a charging terminal, a loading/unloading control apparatus, a fuel refilling terminal, or an examination and repair apparatus.

7. The system of claim 6, wherein the task execution information transmitted from the checkpoint controller indicates whether the vehicle has passed the checkpoint.

8. The system of claim 6, wherein the task execution information transmitted from the ground scale sensor indicates whether the vehicle has been weighed.

9. The system of claim 6, wherein the task execution information transmitted from the charging terminal indicates whether the vehicle has paid a fee.

10. The system of claim 6, wherein the task execution information transmitted from the loading/unloading control apparatus indicates whether the vehicle has loaded or unloaded goods.

11. The system of claim 6, wherein the task execution information transmitted from the fuel refilling terminal includes whether the vehicle has been refilled with fuel.

12. The system of claim 6, wherein the task execution information transmitted from the examination and repair apparatus indicates whether the vehicle has been autonomously examined and repaired.

13. The system of claim 1, wherein the vehicle controller of the vehicle configured to control, in accordance with the transportation plan, the vehicle to: interact with a checkpoint controller corresponding to the position of the checkpoint for autonomously passing the checkpoint; and interact with a loading/unloading control apparatus for autonomous loading/unloading at the loading/unloading position.

14. A method for autonomous vehicle transportation, comprising:
 transmitting a transportation plan for a vehicle to a vehicle controller of the vehicle configured to control, in accordance with the transportation plan, the vehicle to autonomously move to a position of a checkpoint at an entrance to a target highway port and from the position of the checkpoint to a specified loading/unloading position in the target highway port;
 obtaining a transportation plan execution progress for the vehicle executing the transportation plan; and
 adjusting the transportation plan for the vehicle based on the transportation plan execution progress for the vehicle.

15. The method of claim 14, further comprising:
receiving task execution information for the vehicle executing the transportation plan from a terminal device within the target highway port in the transportation plan; and
generating the transportation plan execution progress for the vehicle based on the task execution information.

16. The method of claim 15, further comprising:
marking completed tasks and uncompleted tasks in a transportation task list based on the task execution information.

17. The method of claim 14, further comprising:
generating a transportation task list based on the transportation plan for the vehicle;
transmitting the transportation task list in association with vehicle identification information of the vehicle to a highway port control system corresponding to the target highway port in the transportation plan; and
receiving the transportation plan execution progress for the vehicle from the target highway port control system.

18. The method of claim 17, wherein the highway port control system is configured to mark completed tasks and uncompleted tasks in the transportation task list based on task execution information transmitted from terminal devices within the target highway port.

19. The method of claim 18, wherein the terminal devices included within the highway port include at least one of: a checkpoint controller, a ground scale sensor, a charging terminal, a loading/unloading control apparatus, a fuel refilling terminal, or an examination and repair apparatus.

20. The method of claim 14, wherein the vehicle controller of the vehicle configured to control, in accordance with the transportation plan, the vehicle to: interact with a checkpoint controller corresponding to the position of the checkpoint for autonomously passing the checkpoint; and interact with a loading/unloading control apparatus for autonomous loading/unloading at the loading/unloading position.

* * * * *